US012786506B2

(12) United States Patent
Christensen et al.

(10) Patent No.: US 12,786,506 B2
(45) Date of Patent: Nov. 3, 2026

(54) SYSTEM AND METHOD TO REVIEW ONLINE VIOLENCE AND EDUCATION

(71) Applicant: SRI International, Menlo Park, CA (US)

(72) Inventors: Claire Christensen, Cambridge, MA (US); Anirban Roy, San Francisco, CA (US); Ajay Divakaran, Monmouth Junction, NJ (US); Todd Grindal, Arlington, MA (US)

(73) Assignee: SRI INTERNATIONAL, Menlo Park, CA (US)

( * ) Notice: Subject to any disclaimer, the term of this patent is extended or adjusted under 35 U.S.C. 154(b) by 16 days.

(21) Appl. No.: 18/737,444

(22) Filed: Jun. 7, 2024

(65) Prior Publication Data

US 2024/0414394 A1 Dec. 12, 2024

Related U.S. Application Data

(60) Provisional application No. 63/472,172, filed on Jun. 9, 2023.

(51) Int. Cl.
*H04N 21/44* (2011.01)
*H04N 21/439* (2011.01)

(52) U.S. Cl.
CPC ... *H04N 21/44008* (2013.01); *H04N 21/4394* (2013.01)

(58) Field of Classification Search
CPC .................... H04N 21/44008; H04N 21/4394
USPC .......................................................... 386/248
See application file for complete search history.

(56) References Cited

U.S. PATENT DOCUMENTS

| | | | | |
|---|---|---|---|---|
| 11,368,756 | B1 * | 6/2022 | Tran | G06N 3/0464 |
| 11,533,495 | B2 * | 12/2022 | Jain | H04N 19/136 |
| 12,198,432 | B2 * | 1/2025 | Li | G06V 10/774 |
| 2022/0284321 | A1 | 9/2022 | Yuan et al. | |

(Continued)

FOREIGN PATENT DOCUMENTS

| | | | | |
|---|---|---|---|---|
| CN | 113821656 A | * 12/2021 | | G06N 3/045 |
| CN | 114860938 A | * 8/2022 | | G06N 3/045 |

OTHER PUBLICATIONS

English Translation of Chinese Publication CN113704466 Nov. 2021).*

(Continued)

*Primary Examiner* — Loi H Tran
(74) *Attorney, Agent, or Firm* — Shumaker & Sieffert, P.A.

(57) ABSTRACT

A computing system is configured to obtain a video that includes text elements and visual elements. The computing system is further configured to generate a plurality of text tokens representative of audio spoken in the video and a plurality of frame tokens representative of one or more frames of the video. The computing system is further configured to generate a set of features that includes a text feature, a frame feature, and a multi-modal feature, wherein the multi-modal feature is representative of multi-modal elements of the video, and wherein generating the set of features is based on the plurality of text tokens and the plurality of frame tokens. The computing system is further configured to associate the set of features with one or more labels to generate a multi-label classification of the video. The computing system is further configured to output an indication of the multi-label classification of the video.

20 Claims, 7 Drawing Sheets

(56) References Cited

U.S. PATENT DOCUMENTS

| | | | | |
|---|---|---|---|---|
| 2022/0292269 | A1 | 9/2022 | Niu et al. | |
| 2023/0050573 | A1* | 2/2023 | Liu | G06V 10/7715 |
| 2023/0154213 | A1* | 5/2023 | Gao | G06V 10/25 382/159 |

OTHER PUBLICATIONS

English Translation of Chinese Publication CN112735195 Apr. 2021.*
"English Language Arts Standards", National Governors Association Center for Best Practices, Council of Chief State School Officers, Retrieved from: https://www.thecorestandards.org/ELA-Literacy/, Accessed on: Mar. 15, 2024, 2 pp.
"Head Start Early Learning Outcomes Framework", Head Start ECLKC, Retrieved from: https://eclkcohs.acfhhs.gov/school-readiness/article/head-start-early-learning-outcomes-framework, Accessed on: Mar. 15, 2024, 2 pp.
"Interactive Head Start Early Learning Outcomes Framework: Ages Birth to Five", Retrieved from: https://eclkc.ohs.acf.hhs.gov/interactive-head-start-early-learning-outcomes-framework-ages-birth-five, Accessed on: Mar. 15, 2024, 15 pp.
"The Heilmeier Catechism", Defense Advanced Research Projects Agency, Retrieved from: https://www.darpa.mil/work-with-us/heilmeier-catechism, Accessed on: Mar. 15, 2024, 2 pp.
Argaw et al., "Long-range Multimodal Pretraining for Movie Understanding", 2023 IEEE/CVF International Conference on Computer Vision (ICCV), Aug. 18, 2023, pp. 13392-13403.
Auxier et al., "Parenting Children in the Age of Screens", Pew Research Center, Jul. 28, 2020, 9 pp.
Bushman et al., "Understanding Causality in the Effects of Media Violence", American Behavioral Scientist, vol. 59, No. 14, Jul. 2015, pp. 1808-1821.
Ennemoser et al., "Relations of Television Viewing and Reading: Findings From a 4-Year Longitudinal Study", Journal of Educational Psychology, vol. 99, No. 2, May 2007, p. 349-368.
Gupta et al., "Class Prototypes based Contrastive Learning for Classifying Multi-Label and Fine-Grained Educational Videos", 2023 IEEE/CVF Conference on Computer Vision and Pattern Recognition (CVPR), Jun. 17, 2023, pp. 19923-19933.
Hurwitz, "Getting a Read on Ready To Learn Media: A Meta-analytic Review of Effects on Literacy", Child Development,, vol. 90, No. 5, Oct. 2019, p. 1754-1771.
Mares et al., "Effects of Sesame Street: A meta-analysis of children's learning in 15 countries", Journal of Applied Developmental Psychology, vol. 34, No. 3, May 2013, pp. 140-151.
Mares et al., "Positive Effects of Television on Children's Social Interactions: AMeta-Analysis", Mediapsychology, vol. 7, 2005, p. 301-322, (Applicant points out, in accordance with MPEP 609. 04(a), that the year of publication, 2005, is sufficiently earlier than the effective U.S. filing date, so that the particular month of publication is not an issue.).
Rideout et al., "The Common Sense Census: Media Use by Kids Age Zero to Eight, 2020", Common Sense Media, Nov. 17, 2020, 65 pp.
Van Kessel et al., "A Week in the Life of Popular YouTube Channels", Pew Research Center, Jul. 25, 2019, 7 pp.
Zellers et al., "Merlot Reserve: Neural Script Knowledge Through Vision and Language and Sound", IEEE/CVF Conference on Computer Vision and Pattern Recognition (CVPR), Jan. 7, 2022, pp. 16375-16387.
Zhang et al., "Better and Faster: Knowledge Transfer from Multiple Self-supervised Learning Tasks via Graph Distillation for Video Classification", arXiv: 1804.10069v1, Apr. 26, 2018, 7 pp.
Jung et al., "Discriminative Feature Learning for Unsupervised Video Summarization", The Thirty-Third AAAI Conference on Artificial Intelligence (AAAI-19), Jan. 27, 2019, pp. 8537-8544.
Li et al., "Set-Constrained Viterbi for Set-Supervised Action Segmentation", 2021 IEEE/CVF Conference on Computer Vision and Pattern Recognition (CVPR), Jun. 20, 2021, 10 pp.
Li et al., "Weakly Supervised Energy-Based Learning for Action Segmentation", 2019 IEEE/CVF International Conference on Computer Vision (ICCV), Oct. 27, 2019, pp. 6243-6251.

* cited by examiner

SYSTEM AND METHOD TO REVIEW ONLINE VIOLENCE AND EDUCATION

This application claims the benefit of U.S. Provisional Patent Application No. 63/472,172, filed 9 Jun. 2023, the entire contents of which is incorporated herein by reference.

TECHNICAL FIELD

This disclosure relates to computing systems and, more specifically, to a content filtering system.

BACKGROUND

Online platforms make available a variety of content, such as videos. For example, an online video platform may enable users to stream videos created and uploaded by other users of the platform. The online video platform may organize videos by a variety of different categories. For example, the online video platform may organize videos that are appropriate for children into a particular collection of "kids" videos.

SUMMARY

In general, this disclosure describes video classification techniques for generating multi-label classifications of videos by generating frame, text, and multimodal features of a video and organizing the videos based on one or more classifications. An individual or organization may seek to identify videos for a child to watch that not only contain appropriate content for children but that also contain educationally relevant content.

Rather than manually watching, classifying, and approving individual videos, an individual or organization may employ the video classification techniques to classify videos and subsequently identify videos that are appropriate for another individual or group of individuals (e.g., a child/children) to view. For example, a parent may find the process of manually reviewing every video that their child watches for inappropriate content unduly time-consuming and tedious. In addition, the parent may struggle to select videos that are tailored to a child's particular educational level and needs. An alternative approach is to classify videos based on one or more classifications to generate multi-label classifications of the videos.

In an example, an analysis system may generate and/or extract tokens from a video and process the tokens to create features of the video which are associated with one or more labels in a multi-label classification. The analysis system may generate tokens that include multimodal tokens using a fusion encoder to encode both text and visual cues from a video into the multimodal tokens. The analysis system may process the multimodal tokens into features representative of the text, video, and multi-modal cues of the video for use in a multi-label contrastive processing of the features. As part of the multi-label contrastive processing, the analysis system may associate the features with one or more class prototypes that are based on educational content codes among other characteristics. The analysis system may output an indication of the multi-label classification for use by one or more recipients, such as a video platform and/or user system.

In an example, a method includes obtaining, by a computing system, a video that includes text elements and visual elements; generating, by the computing system and based on the text elements and the visual elements, a plurality of text tokens representative of audio spoken in the video and a plurality of frame tokens representative of one or more frames of the video; generating, by the computing system using a machine learning model, a set of features that includes a text feature, a frame feature, and a multi-modal feature, wherein the multi-modal feature is representative of multi-modal elements of the video, and wherein generating the set of features is based on the plurality of text tokens and the plurality of frame tokens; associating, by the computing system, the set of features with one or more labels to generate a multi-label classification of the video; and outputting, by the computing system, an indication of the multi-label classification of the video.

In another example, a computing system includes a memory and one or more programmable processors in communication with the memory and configured to obtain a video that includes text elements and visual elements; generate, based on the text elements and the visual elements, a plurality of text tokens representative of audio spoken in the video and a plurality of frame tokens representative of one or more frames of the video; generate, using a machine learning model, a set of features that includes a text feature, a frame feature, and a multi-modal feature, wherein the multi-modal feature is representative of multi-modal elements of the video, and wherein generating the set of features is based on the plurality of text tokens and the plurality of frame tokens; associate the set of features with one or more labels to generate a multi-label classification of the video; and output an indication of the multi-label classification of the video.

In yet another example, non-transitory computer-readable media includes instructions configured to cause one or more processors to obtain a video that includes text elements and visual elements; generate, based on the text elements and the visual elements, a plurality of text tokens representative of audio spoken in the video and a plurality of frame tokens representative of one or more frames of the video; generate, using a machine learning model, a set of features that includes a text feature, a frame feature, and a multi-modal feature, wherein the multi-modal feature is representative of multi-modal elements of the video, and wherein generating the set of features is based on the plurality of text tokens and the plurality of frame tokens; associate the set of features with one or more labels to generate a multi-label classification of the video; and output an indication of the multi-label classification of the video.

DETAILED DESCRIPTION

Figure 1:
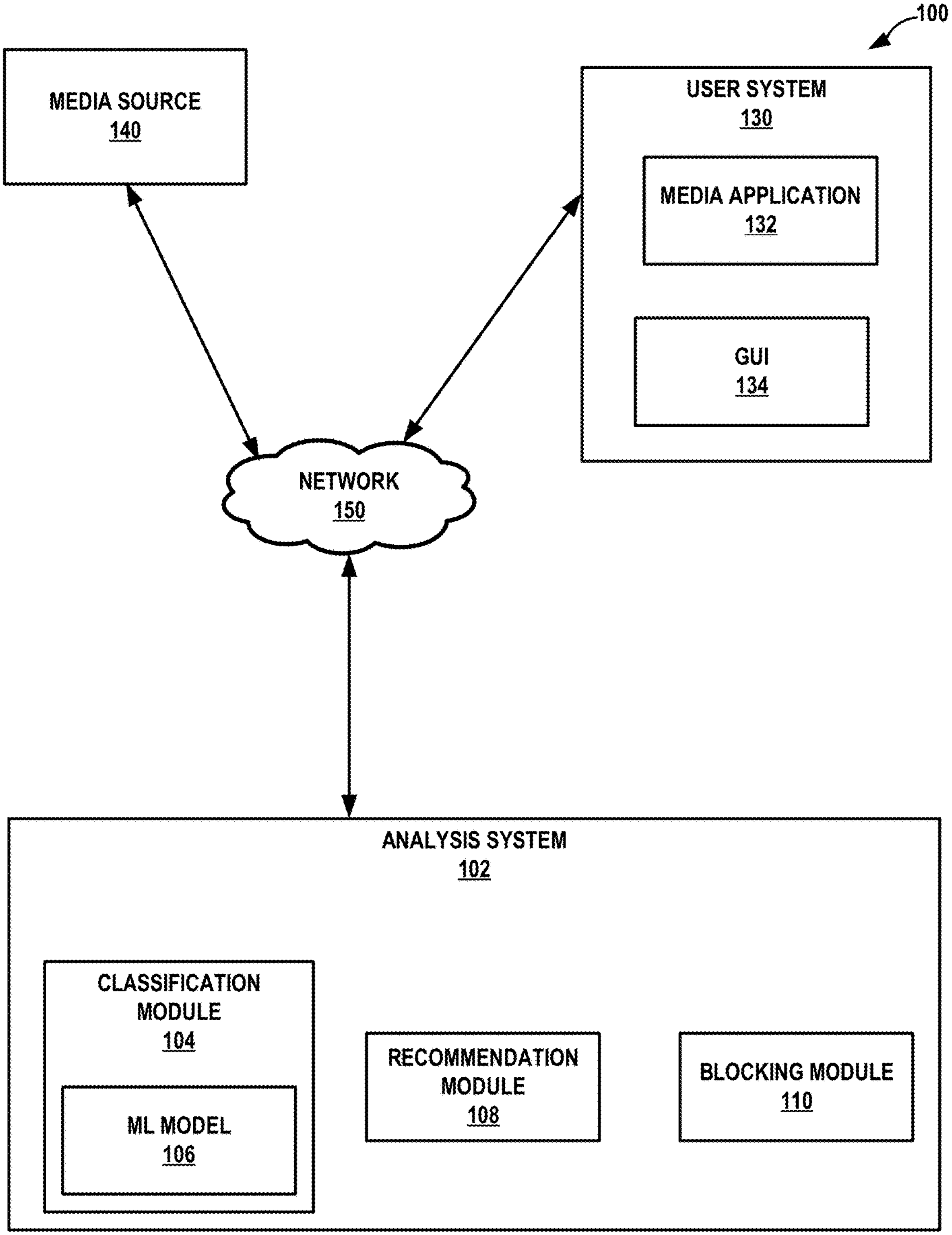
FIG. 1 is a block diagram illustrating an example computing environment for content classification, in accordance with one or more techniques of this disclosure.

FIG. 1 is a block diagram illustrating an example computing environment 100 for classification, in accordance with the techniques of this disclosure. Computing environment 100 includes analysis system 102, user system 130, media source 140, and network 150.

Analysis system 102 may be one or more types of computing system and/or device, such as a server, mainframe, supercomputer, cloud computing environment, distributed computing environment, virtualized computing environment, desktop computer, laptop computer, tablet computer, smartphone, or other type of computing device. In some examples, analysis system 102 may be integrated with one or more other systems, such as user system 130 and/or media source 140. Analysis system 102 may include one or more processors that execute instructions of one or more processes of analysis system 102. For example, analysis system 102 may include one or more of Field-Programmable Gate Arrays (FPGAs), Application-Specific Integrated Circuits (ASICs), Reduced Instruction Set Computer (RSIC) processors, multi-core processors, single-core processors, virtualized processors, and/or other types of processors. Analysis system 102 may include one or more software components that are executed by one or more processors of analysis system 102. For example, analysis system 102 may include one or more programs executed by a processor of analysis system 102 that communicate with user system 130 and/or media source 140.

User system 130 may be a computing system and/or device associated with a user. For example, user system 130 may be smartphone, smartwatch, augmented reality (AR) glasses/goggles, virtual reality (VR) glasses/goggles, tablet computer, smartwatch, vehicle entertainment system, gaming system, streaming device, smart television, set-top box, laptop computer, desktop computer, and/or other type of computing device/system. User system 130 may communicate with one or more other computing devices/systems. For example, user system 130 may communicate with media source 140 via network 150.

Network 140 may include one or more types of networks, such as cellular networks, Wide Area Networks (WAN), Local Area Networks (LAN), and other types of networks. Network 140 may represent the internet. Network 140 may communicatively interconnect one or more computing systems and/devices. For example, network 140 may enable communication between user system 130 and media source 140.

Media source 140 stores video content and presents the video content to consumers. Media source 140 may represent an online video platform. Media source 140 may present the video content by streaming the video content to a device for real-time video consumption, by making the video available to a device for download and/or caching, or by otherwise outputting the video content to another device. Media source 140 may store many thousands or even millions of videos of various lengths, each video including video content. Video content includes image data but may also include audio data. The audio data may include speech that can be transcribed into text using speech recognition. Each video may also be associated with metadata for the video. The metadata may include a Uniform Resource Locator (URL) at which the video is available, an identity of the source, an identity of the creator, a length, a primary language, a content description, or other metadata for the video.

Media source 140 may be a computing platform and/or computing system. Media source 140 may be a collection of one or more computing systems, storage systems, cloud computing environments, virtualized computing environments, and/or other types of computing systems.

Media source 140 may enable computing systems and devices to obtain videos from media source 140. Media source 140 may enable a computing system, such as user system 130, to search for and obtain videos from media source 140. For example, media source 140 may provide data indicating one or more videos available from media source 140 in response a query received from user system 130 and/or analysis system 102. Media source 140 may stream, via network 150, videos to user system 130 for consumption by a user of user system 130 or for processing by analysis system 102. Additionally, media source 140 may generate and output video recommendations for users. For example, media source 140 may use one or more algorithms to recommend videos based on previously viewed videos. Media source 140 may output the video recommendations via one or more interfaces such as a website associated with media source 140, a companion application executed by user system 130 such as media application 132, etc.

Media source 140 may organize videos by one or more categories such as recommended age, topic, source (e.g., the user or entity that uploaded or created a particular video), and other types of categorizations. Media source 140 may organize the videos based on the one or more categories to assist users with finding videos that they wish to view. For example, media source 140 may enable a user to find videos that are algebra tutorials. In another example, media source 140 may enable a user to find videos that teach the alphabet. Media source 140 may include a platform for child-appropriate videos that limits the videos available to view to those that meet one or more content requirements (e.g., restrictions on content such as violence advertising, etc.). For example, media source 140 may include a children-focused video platform that includes a collection of videos selected as meeting the one or more content requirements.

In general, user system 130 may interact with media source 140 to obtain videos for consumption. An individual (e.g., a parent/guardian) who manages the use of user system 130 by a user may wish to obtain videos for consumption by the user (e.g., a child using user system 130) that are not only safe/appropriate for consumption by the user but that also include educational content that is relevant for the user. The individual may struggle to identify videos that are safe for consumption by the user and that also include educational content that is relevant/tailored to the needs of the user. For example, the individual may struggle to select videos for viewing via user system 130 for a child in elementary school that are tailored to the current educational level of the child and appropriate for the child to watch. Additionally, media source 140 may be unable to filter out every video uploaded to a child-focused portion of media source 140 that includes inappropriate content.

In accordance with the techniques of this disclosure, analysis system 102 may analyze videos obtained from media source. Analysis system 102 may obtain videos from media source 140 and process the videos to generate multi-label classifications for the videos. Analysis system 102 may generate text tokens that are representative of audio in a video and video tokens representative of one or more frames of the video. Analysis system 102 may generate a set of features that includes a text feature, a frame feature, and a multimodal feature. Analysis system 102 may associate the set of features with one or more labels to generate a multi-label classification of the video. Analysis system 102 may generate a multi-label classification based on labels that are educational and content labels. For example, analysis system 102 may generate multi-label classifications that are based on educational content standards (e.g., grade-levels, subject matters, etc.).

Analysis system 102 may preemptively obtain videos from media source 140 to enable analysis system 102 to preemptively identify videos that are appropriate for a user of user system 130. Analysis system 102 may obtain videos from media source 140 using one or more techniques. Analysis system 102 may crawl for and/or scrape videos from media source 140. For example, analysis system 102 may obtain videos using a search function of the media platform. For example, analysis system 102 may generate search terms for videos (e.g., search terms consistent with particular types of videos, such as educational videos) and search for videos on media source 140 using the generated search terms. In some examples, analysis system 102 may obtain videos from media source 140 in response to a request from user system 130. Analysis system 102 may provide video and metadata for the videos to one or more components, such as classification module 104.

Analysis system 102 includes classification module 104. Classification module 104 may be a software component of analysis system 102, such as a program, process, module, plugin, or other type of software component. Classification module 104 may be executed by one or more processors of analysis system 102. Classification module 102 may process videos obtained from media source 140. Classification module 102 may process the videos to generate and/or extract tokens from the videos.

In an example, analysis system 102 provides a video to classification module 104 for processing. Classification module 104 processes the video to generate text tokens representative of audio spoken in the video and frame tokens representative of image data (e.g., frames) of the video. Classification module 104 may generate tokens that are mathematical representations of cues from the videos, such as vectorized representations of the cues. Audio spoken in a video (i.e., speech) can include recitation, songs, or other forms of verbal communication. Classification module 104 may use automatic speech recognition (ASR) to extract text from audio of the video and generate text tokens using a text encoder and based on the extracted text. Classification module 104 may generate the frame tokens using an image encoder. Classification module 104 may provide the tokens to a machine learning model such as ML model 106.

Classification module 104 includes ML model 106. ML model 106 may include one or more machine learning (ML) models, such as neural networks, deep learning network, transformer models, encoders, feed-forward networks, perceptrons, time delay neural networks (TDNN), reinforcement learning networks, Q-learning networks, and/or other types of ML models. For example, ML model 106 may include an encoder that applies multi-head cross attention to one or more tokens, and ML model 106 may include one or more multi-layer perceptrons (MLPs).

ML model 106 may include a fusion encoder that generates multi-modal tokens. The fusion encoder may process the text tokens and the frame tokens and generate multi-modal tokens that are representative of multi-modal elements of a video (e.g., a combination of video and audio elements of the video). For example, ML model 106 may generate multi-modal tokens that are vectors or other type of mathematical representation representative of the multi-modal elements of the video. The performance of fusion encoder may improve with more layers. ML model 106 may receive a multi-modal classification token in addition to and/or in lieu of the multi-modal tokens from the fusion encoder.

ML model 106 may generate sets of features for videos. ML model 106 may generate features that are representative of different cues of the videos. ML model 106 may generate sets of features that include a text feature, a video feature, and a multi-modal feature for each video processed by ML model 106. For example, ML model 106 may generate a text feature based on a pooled group of one or more text classification tokens, a video feature based on a frame classification token of the frame tokens, and a multi-modal feature based on a multi-modal classification token.

ML model 106 may generate multi-label classifications of videos. ML model 106 may generate multi-label classifications that are classifications with one or more labels using the generated features. ML model 106 may generate the multi-label classifications using one or more techniques. For example, ML model 106 may associate the features of a video with one or more class prototypes, apply a contrastive loss function to the features, determine a cosine distance between the features and the class prototypes, and/or other techniques or combinations of techniques.

ML model 106 may generate multi-label classifications of videos where the labels are based on educational content requirements. ML model 106 may use labels that correspond to one or more educational requirements or standards (e.g., Common Core State Standards in the United States, local educational requirements, etc.). For example, ML model 106 may use labels that are based on one or more educational codes of an education standard. ML model 106 may generate multi-label classifications that are representative of the educational value of a video (e.g., the content of the video corresponding to one or more educational topics such as mathematics, literature, science, etc.). For example, ML model 106 may use sub-domains of educational content and/or a research-based content rubric. Classification module 104 may provide the multi-label classifications to one or more other components of analysis system 102, such as recommendation module 108. ML model 106 may classify educational content into domains, subdomains, and difficulty levels aligned to standards, such as Common Core State Standards and Head Start Early Learning Outcomes Framework. Using these classifications, analysis system 102 may recommend a personalized, sequenced progression of educational videos. Analysis system 102 may personalize recommendations by matching educational content the child has recently watched. Analysis system 102 may sequence recommendations to encourage repeated exposure to the same learning standards while slowly introducing more advanced standards. Analysis system 102 may follow children from grades PreK-5, adjusting to their viewing habits and learning trajectories over time. Analysis system 102 may use one or more components, such as recommendation module 108 to generate recommendations.

Analysis system 102 includes recommendation module 108. Recommendation module 108 may be a software component, such a program, process, module, plugin, or other type of software component. Recommendation module 108 may generate recommendations for videos based on multi-label classifications generated by classification module 104. Recommendation module 108 may additionally use information regarding a particular user of user system 130 to generate recommendations. Recommendation module 108 may use information regarding a particular user entered by the user and/or entered by an individual associated with the user (e.g., a parent or guardian of the user). For example, recommendation module 108 may use information, such as a user's educational level and/or educational requirements to generate recommendations.

Recommendation module 108 may generate recommendations of videos for a user to watch. Recommendation module 108 may generate recommendations by comparing multi-label classifications to information regarding a user. In an example, recommendation module 108 receives information regarding educational content requirements associated with a user. Recommendation module 108 compares multi-label classifications of a plurality of videos classified by classification module 104 to information regarding educational content requirements associated with the user. Recommendation module 108 determines a set of videos that meet the educational content requirements of the user. For example, recommendation module 108 may receive an indication of educational content requirements associated with a user (e.g., an educational level of a user). Recommendation module 108 may use fine-grained content categories and content difficulty levels in generating recommendations.

Recommendation module 108 may tailor videos to one or more needs of a user. Recommendation module 108 may receive an indication of one or more needs of a user beyond that of educational content requirements of the user such as educational areas where the user needs tutoring. For example, recommendation module 108 may receive an indication that a user requires further mathematical education at their educational level and determine one or more videos that have multi-label classifications consistent with the mathematical education. Recommendation module 108 may determine, based on the multi-label classification of a video, whether a particular video meets one or more content requirements for viewing by a user. Recommendation module 108 may output an indication of whether the particular video meets one or more content requirements for viewing by the user. Recommendation module 108 may generate a recommendation for a user to view a particular video. For example, recommendation module 108 may generate, based on the multi-label classification of the video and the educational content requirements associated with the video, a recommendation for the user to view the video. Recommendation module 108 may output an indication of the recommendation. Further, recommendation module 108 may generate media use insights and parenting tips. Recommendation module 108 may output an indication of the use insights and parenting tips.

Recommendation module 108 may revise and/or update video recommendations. Recommendation module 108 may use information, such as parent preferences, popular video content, and/or child viewing habits, to revise video recommendations. In addition, recommendation module 108 may update video recommendations as a child ages (e.g., as the child moves into more advanced educational content codes). Recommendation module 108 may output an indication of the revised video recommendations.

Analysis system 102 includes blocking module 110. Blocking module 110 may be a software component, such a program, process, module, plugin, or other type of software component. Blocking module 110 may filter and/or block videos from viewing by user system 130. Blocking module 110 may use the multi-label classifications and/or content restrictions to determine one or more videos that should not be viewable or otherwise accessible by a user of user system 130.

In some examples, analysis system 102 is integrated into media source 140 and used by a provider for media source 140 to tailor videos to users. In some examples, analysis system 102 proxies requests sent by user system 130 for videos available from media source 140. The requests can include a request to obtain a particular video and/or a search request for recommended videos available from media source 140. Analysis system 102 may generate and output a recommendation in response to a request, block the request for a particular video, or take other action to process the request. In some examples, analysis system 102 proxies the videos.

Analysis system 102 may provide an indication of one or more videos to user system 130. Analysis system 102 may provide the indication based on generating multi-label classifications for a plurality of videos obtained by analysis system 102. Analysis system 102 may provide the indication for user system 130 to obtain videos that are consistent with educational requirements of a user of user system 130. A media application of user system 130 may obtain those videos based on the indication.

User system 130 includes media application 132. Media application 132 may be an application, module, program, process, or other type of software component executed by user system 130. Media application 132 may provide media player functionality for user system 130. In some examples, media application 132 may be a companion application of media source 140. Media application 132 may enable a user of user system 132 to select and play videos from one or more sources such as media source 140. Media application 132 may display videos via GUI 134.

User system 130 includes GUI 134. GUI 134 may be a graphical user interface (GUI) generated and displayed by one or more components of user system 130. GUI 134 may include one or more visual elements generated by one or more components of user system 130. For example, GUI 134 may be generated by an application, e.g., media application 132 or web browser, and/or operating system of user system 130 and output by a hardware component (e.g., a display) of user system 134.

Media application 132 may obtain one or more videos from media source 140. Media application 132 may obtain one or more video in response to a request from a user and/or in response to receiving an indication of one or more videos from analysis system 102. Media application 132 may obtain a particular set of one or more videos that is based on the indication of one or more videos from analysis system 102. In an example, media application 132 receives a request from a user to play videos. Media application 132 determines, based on the indication of one or more videos from analysis system 102, which videos to request from media source 140. Media application 132 requests a number of videos from media source based on determining which videos to request.

In some examples, media source 140 may determine which videos to provide to media application 132. Media source 140 may receive an indication from analysis system 102 of a selection of videos that analysis system 102 has selected for a user of user system 130. Media source 140 may provide one or more videos from the selection of videos to user system 130 in response to a request for videos from user system 130. In an example, media source 140 receives a request for videos from user system 130. Media source 140 determines a set of videos to provide to user system 130, where the set of videos is based on an indication of a selection of videos from analysis system 102.

Media application 132 may display a selection of videos obtained from media source 140 via GUI 134. Media application 132 may display a selection of videos that is based on the indication received from analysis system 102. For example, media application 132 may display a selection of videos obtained from media source 140, where the selection of videos is based on the indication from analysis system 102 (e.g., media application 132 obtains videos indicated by analysis system 102 as meeting one or more educational content requirements). In some examples, media application 132 may display a selection of videos where the videos of the selection of videos are determined by media source 140 (e.g., media source 140 provides a selection of videos to analysis system 102 based on the indication from analysis system 102).

Analysis system 102 may generate a dataset of curated videos annotated with educational content. Analysis system 102 may follow a standard such as Common Core State Standards to select education content suitable for the kindergarten or prekindergarten level. Analysis system 102 may consider two high-level classes of educational content: literacy and math. For each of these content classes, analysis system 102 may select a set of codes. For the literacy class, Analysis system 102 may select 7 codes and for the math class, analysis system 102 may select 13 codes. Analysis system 102 may associate each video with multiple labels corresponding to these codes. Analysis system 102 may enable annotation of the videos by trained education researchers following standard validation protocol to ensure correctness. Analysis system 102 may generate the dataset as consisting of carefully chosen background videos, i.e., without educational content, that are visually similar to the videos with educational content. In an example, analysis system 102 may generate the data as including expert-annotated videos with multiple classes (e.g., x literacy codes, y math codes, and a background).

Analysis system 102 may use one or more classes of educational content in generating multi-label classifications. For example, analysis system 102 may consider two high-level classes of educational content: literacy and math. For each of these content classes, analysis system 102 may select a set of codes. For the literacy class, analysis system 102 may select codes including, e.g., letter names, letter sounds, following words left to right when reading, sight words, letters in words, sounds in words, and rhyming. For the math class, analysis system 102 may select codes including, e.g., counting, written numerals, cardinality, comparing groups, subitizing, addition and subtraction, measurable attributes, sorting, spatial language, shape identification, building and drawing shapes, analyzing and comparing shapes, and patterns.

Analysis system 102 may validate multi-label classifications of video. To ensure the quality and correctness of the annotations, analysis system 102 may consider educational researchers to annotate the videos and follow a standard validation protocol. Analysis system 102 may use annotators trained by an expert. In addition, analysis system 102 may examine annotations on a selected set before engaging the annotator for the final annotation. Analysis system 102 may enable annotators to start once they reach 90% agreement with the expert. Further, analysis system 102 may estimate inter-annotator consistency to re-train annotators. Analysis system 102 may allow a period of time such as a month to train an education researcher to match expert-level coding accuracy.

Analysis system 102 may curate videos from sources, such as media source 140, and enable annotation by the trained annotators to determine educational content in them. Analysis system 102 may generate a multi-label classification for each video, for each video may have multiple class labels that are quite similar, making the task a multi-label and fine-grained classification problem. For example, 'letter names' and 'letter sounds' where visual letters are shown in both but in 'letter sounds', analysis system 102 may emphasize the phonetic sound on the letter. Similarly, in both 'build and draw shapes' and 'analyzing and comparing shapes', multiple shapes can appear but analysis system 102 may focus the latter by comparing multiple shapes by shape and size. Analysis system 102 may conduct this task as different from common video classification setups where either multi-label or fine-grained aspects are dealt separately. Analysis system 102 may use single-label datasets such as HMDB51, UCF101, Kinetics700 and multi-label ones such as Charades as benchmarks for this problem. In addition, analysis system 102 may use YouTube-Birds and YouTube-Cars as analogous datasets for object recognition from videos and Multi-Sports and FineGym as labeled fine-grained action classes for sports. Analysis system 102 may use HVU as adding scenes and attributes annotations along with action and objects. Analysis system 102 may use the multi-label classification as action, object and scene recognition may not be enough for fine-grained video understanding. For instance, videos from a given education provider may share similar objects (person, chalkboard, etc.) and actions (writing on chalkboard) while covering different topics (counting, shape recognition etc.) in each video.

The techniques of this disclosure may include one or more technical advantages that realize one or more practical applications. For example, analysis system 102 may enable a parent and/or guardian of a user of user system 130 to ensure that videos viewed by the user are appropriate for the user (e.g., do not contain objectionable content and are age-appropriate). Analysis system 102 may more accurately classify videos, particular with regarding to educational content classifications, than existing classification techniques. For example, the use of multi-modal tokens and multi-label classification techniques may enable analysis system to more accurately classify videos based on their educational content compared to the existing classification techniques. In addition, the use of multi-label classifications may enable analysis system to provide more comprehensive classifications across a wide range of labels (e.g., educational content codes) instead of being limited to classifying to a single label. Further, analysis system 102 may enable the parent/guardian to tailor videos to the current educational content requirements of the user. For example, analysis system 102 may enable the parent/guardian to tailor the videos shown to the user based on an educational level of the user while avoiding the onerous and time-consuming need to manually and preemptively review each video before consumption.

Figure 2:
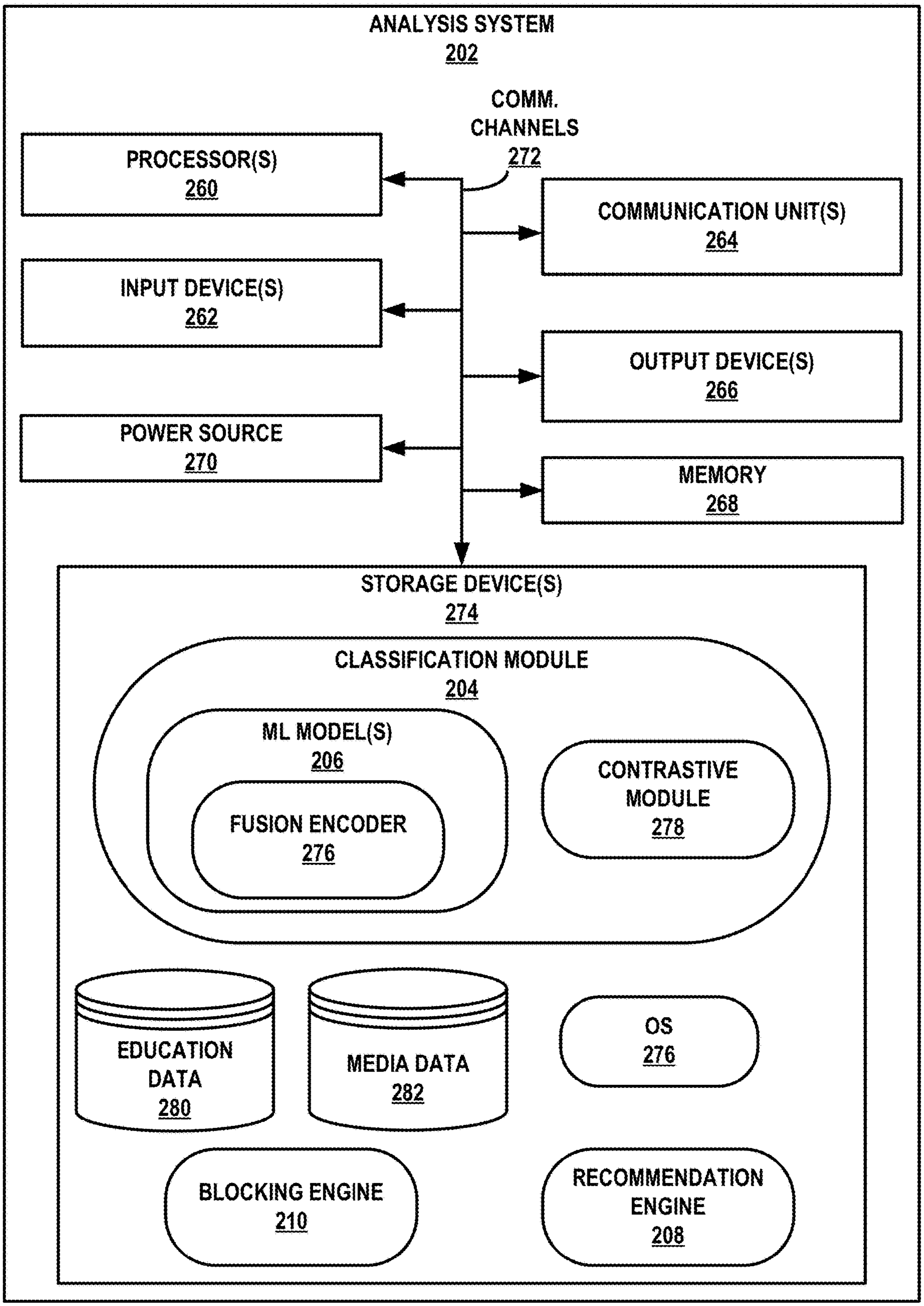
FIG. 2 is a block diagram illustrating an example analysis system, in accordance with one or more techniques of this disclosure.

FIG. 2 is a block diagram illustrating an example analysis system 202, in accordance with one or more techniques of this disclosure. Analysis system 202 may be similar to analysis system 102 as illustrated in FIG. 1 and provide similar functionality. For example, analysis system 202 may include one or more types of computing system.

Analysis system 202 includes one or more of processors 260. Processors 260 may include one or more types of processors. For example, processors 260 may include one or more of FPGAs, ASICs, graphics processing units (GPUs), central processing units (CPUs), reduced instruction set (RISC) processors, and/or other types of processors or processing circuitry. Processors 260 may execute the instructions of one or more programs and/or processes of analysis system 202. For example, processors 260 may execute instructions of a process stored in memory 268.

Analysis system 202 includes memory 268. Memory 268 may include one or more types of volatile data storage such as random access memories (RAM), dynamic random access memories (DRAM), static random access memories (SRAM), and other forms of volatile memories known in the art. Memory 268 may additionally or alternatively include one or more types of non-volatile data storage. Memory 268 may store data such as instructions for one or more processes of analysis system 202. For example, memory 268 may store instructions of an operating system for execution by processors 260. Memory 268 may store data provided by one or more components of analysis system 202. For example, memory 268 may store information provided by communication units 264.

Analysis system 202 includes one or more of communication units 264. Communication units 264 may include one or more types of communication units/components such radios, modems, transceivers, ports, and/or other types of communication components. Communication units 264 may communicate using one or more communication protocols such as WIFI, BLUETOOTH, cellular communication protocols, satellite communication protocols, Asynchronous Transfer mode (ATM), ETHERNET, TCP/IP, optical network protocols such as Synchronous Optical Networking (SONET) and Synchronous Digital Hierarchy (SDH), and other types of communication protocols. Communication units 264 may enable analysis system 202 to communicate with one or more computing systems and devices. For example, communication units may enable analysis system 202 to communicate with a user system such as user system 130 via network 170 as illustrated in FIG. 1.

Analysis system 202 includes one or more of input devices 262. Input devices 262 may include one or more devices and/or components capable of receiving input such as touchscreens, microphones, keyboards, mice, and other types of input devices. Input devices 262 may enable a user of analysis system 202 to provide input to analysis system 202. For example, input devices 262 may enable a user of analysis system 202 to type input via a keyboard.

Analysis system 202 includes one or more of output devices 266. Output devices 266 may include one or more devices and/or components capable of generating output such as displays, speakers, haptic engines, light indicators, and other types of output devices. Output devices 266 may enable analysis system 202 to provide output to a user of analysis system 202.

Analysis system 202 includes power source 270. Power source 270 may include one or more sources of power for analysis system 202 such as solar power, battery backup, generator backup, and power from an electrical grid. For example, analysis system 202 may be powered by power source 270 that includes a connection to an electrical grid and a generator backup.

Analysis system 202 includes one or more of communication channels 272 (illustrated as "COMM. CHANNELS 272" in FIG. 2). Communication channels 272 may include one or more communication channels that interconnect one or more components of analysis system 202. Communication channels 272 may include one or more types of communication channels such as hardware interconnects and/or software interconnects. For example, communication channels 272 may include a hardware interconnect between memory 268 and storage devices 274.

Analysis system 202 includes one or more of storage devices 274. Storage devices 274 may include one or more devices and/or components capable of storing data. Storage devices 274 may include one or more types of non-volatile storage devices such as magnetic hard drives, magnetic tape drives, cloud storage, remote storage, solid state drives, NVM Express (NVMe) drives, optical media, and other types of non-volatile storage. In some examples, storage devices 274 may include one or more types of volatile storage devices.

Storage devices 274 includes OS 276. OS 76 may include one or more types of operating system (OS) such as desktop, enterprise, mobile, or other type of OS. OS 276 may provide an execution environment for one or more programs and/or processes of analysis system 202. For example, OS 276 may provide an execution environment for one or more software components of analysis system 202 such as classification module 276.

Storage devices 274 includes classification module 204. Classification module 204 may be similar to classification module 104 as illustrated in FIG. 1 and provide similar functionality. For example, classification module 204 may be a software component that generates multi-label classifications of videos from one or more sources of media.

Classification module 204 may cause analysis system 202 to obtain videos from one or more sources. For example, classification module 204 may cause analysis system 202 to obtain videos from media source 140 as illustrated in FIG. 1. Classification module 204 may cause one or more components of analysis system 202 to obtain videos. For example, classification module 204 may cause communication units 264 to transmit a request for videos to media source 140. Classification module 204 may cause one or more components of analysis system 202 to obtain videos in response to a request from user system 130. In an example, analysis system 202 receives a request for videos from user system 130. Responsive to the receipt of the request, classification module 204 cause communication units 264 to provide a request for videos to media source 140. Classification module 204 may generate the request for videos as including one or more requirements such as search terms, categories of the videos, publishing date ranges, and other requirements.

Classification module 204 may process videos. Classification module 204 may process obtained videos to generate multi-label classifications of the videos. Classification module 204 may generate multi-label classifications where each label of a given multi-label classification corresponds to a characteristic/cue of the video. For example, classification module 204 may generate a multi-label classification where each label corresponds to an educational content standard (e.g., an educational content code from the Common Core standards). Classification module 204 may use one or more ML models such as ML models 206 to generate the multi-label classifications.

Classification module 204 includes one or more of ML models 206. ML models 206 may be similar to ML model 106 as illustrated in FIG. 1 and provide similar functionality. For example, ML models 206 may include one or more machine learning models such as neural networks, deep learning network, transformer models, encoders, feed-forward networks, perceptrons, time delay neural networks (TDNN), reinforcement learning networks, Q-learning networks, and/or other types of ML models. ML models 206 may include one or more ML models in one or more stages.

For example, ML models 206 may include a first stage of an encoder model and a second stage of multi-layer perceptrons.

ML models 206 may use an initial processing of the obtained videos. ML models 206 may initially process the videos to generate data for use encoding tokens of the videos. ML models 206 may apply ASR to process the videos and generate text data from the videos (e.g., generate transcripts for the videos). ML models 206 may additionally and/or alternatively generate frame data of the videos. ML models 206 may generate frame data of the videos by "breaking up" the videos into the individual frames of the videos.

ML models 206 may generate text tokens and one or more text classification (CLS) tokens. ML models 206 may generate tokens for a video using the text data and the frame data. ML models 206 may generate text tokens that each denotes a unit of meaning within the text data. Text tokens may include, e.g., representations of words within the video transcripts (such as words or sub-words), characters, or vectorized representations of portions of the text data. ML model 206 may generate text tokens based on the text data and using a text encoder. For example, ML model 206 may use a text encoder to generate text tokens based on the text extracted from the videos. ML model 206 may use a transformer to generate word embeddings and the text CLS token representative of a sequence of text tokens for a given video. For example, ML model 206 may use a Bidirectional Encoder Representations from Transformers (BERT)-based text transformer to generate the one or more text CLS tokens.

ML model 206 may generate frame tokens. ML model 206 may generate frame tokens based on the frame data and using a frame encoder. ML models 206 may generate frame tokens. Frame tokens may be, e.g., image features of the frame, region-based image features of the frame, or vectorized representations of frames, based on the frame data. For example, ML model 206 may use an image encode that includes a vision transformer (ViT) to generate frame tokens based on the frame data. ML models 206 may generate one or more frame CLS tokens for the video tokens. For example, ML models 206 may generate a frame CLS token for each frame token for a given video. ML models 206 may generate a frame CLS token that is representative of a sequence of frame tokens for a given video. For example, ML models 206 may generate one or more frame CLS tokens that are corresponding vectors of one or more frames and based on one or more of the frame tokens. ML models 206 may pool the frame CLS tokens to generate a representation of the frame tokens.

ML models 206 may generate multi-modal tokens. ML models 206 may generate multi-modal tokens that are representative of a fusion of the text and video of a video. ML models 206 may use one or more ML models and/or techniques to generate the multi-modal tokens. For example, ML models 206 may use fusion encoder 276 to generate multi-modal tokens for a video.

ML models 206 include fusion encoder 276. Fusion encoder 276 may be a module of classification module 204 that includes one or more ML models and/or other software components. For example, fusion encoder 276 may include a transformer model and a feed forward network among other software components. Fusion encoder 276 may process text tokens, image tokens, and an initial multi-modal CLS token of a video. In an example, fusion encoder 276 receives a plurality of text tokens, a plurality of frame tokens, and an initial multi-modal CLS token from classification module 204. Fusion encoder 276 processes the received tokens through a transformer model and a feed forward network and outputs a multi-modal CLS token. Fusion encoder 276 may output a multi-modal CLS token representative of multi-modal characteristics of a given video.

ML models 206 may process the text, frame, and multi-modal CLS tokens into features. ML models 206 may process the text CLS token for a given video into text features of the video, the pooled frame CLS tokens into frame features of the video, and the multi-modal CLS token into multi-modal features of the video. ML models 206 may generate features that are representations of audio, video, and/or multi-modal cues of the video. For example, ML models 206 may generate a representation of a video, z, that includes video feature $z^v$, text features $z^t$, and multi-modal (e.g., fusion) features $z^f$ such that $z=\{z^v, z^t, z^f\}$. ML models 206 may use one or more ML models to generate the features for a video. For example, ML models 206 may use a first encoder to generate the video features, a second encoder to generate the text features, and a third encoder to generate the multi-modal features. ML models 206 provide the features to contrastive module 204.

Contrastive module 204 includes contrastive module 278. Contrastive module 278 may be a software component of classification module 204. Contrastive module 278 may process features generated by ML models 206 and generate multi-label classifications of videos. Contrastive module 278 may associate the features with one or more class prototypes representative that are each representative of one or more characteristics such as educational codes. For example, contrastive module 278 may associate features of a video with one or more class protypes, where each class prototype is a representative of an educational code. Contrastive module 278 may use one or more techniques to associate the features of videos with the class prototypes such a determining a distance between each feature and the class protypes, using a contrastive learning model, and/or other techniques. Contrastive module 278 may use one or more distance metrics, such as cosine distance, Euclidian distance, and/or other types of distance metrics.

Contrastive module 278 may associate a set of features with one or more labels. Contrastive module 278 may associate the set of features using one or more techniques. For example, contrastive module 278 may apply a contrastive loss function to the set of features. Contrastive module 278 may determine, using the contrastive loss function, a distance between each class prototype of one or more class prototypes and a corresponding feature of the set of features, where each class prototype of the one or more class prototypes are representative of a corresponding classification. Contrastive module 278 may determine the distance as a cosine distance between the class prototypes and corresponding features.

Contrastive module 278 may generate and/or learn one or more class prototypes. Contrastive module 278 may use one or more ML models to generate (e.g., learn) the one or more class prototypes. For example, contrastive module 278 may use an ML model to generate class prototypes based on education data 280, where each class prototype is representative of a corresponding education standard or code. Contrastive module 278 may learn the one or more class prototypes based on maximized distance between each of the one or more class prototypes.

Storage devices 274 include education data 280. Education data 280 may be a database, data structure, or other type of information storage scheme. Education data 208 may include information regarding educational standards of a plurality of locales and for a range of education levels. For example, education data 208 may include information regarding educational standards for one or more states of the US and associated local jurisdictions (e.g., county and city education requirements) for K-12 grades. Education data 208 may additionally or alternatively include educational information and standards of other countries. Education data 208 may include information regarding educational content codes. For example, education data 208 may include information regarding educational content codes that are representative of educational topics and grade levels.

Contrastive module 278 may use information obtained from education data 280 to generate class prototypes. Contrastive module 278 may generate one or more class prototypes based on an associated educational content code obtained from education data 280. In an example, contrastive module 278 obtains information from education data 280 regarding seventh grade-level mathematical topics and generates one or more class prototypes based on the obtained information. Contrastive module 278 may store information regarding class prototypes, multi-label classifications, and other information in media data 282.

Storage devices 274 include media data 282. Media data 282 may be a database, data structure, and/or other type of data storage. Media data 282 may maintain information such as class prototypes, identifiers of videos, multi-label classifications of videos, and other information. One or more components of analysis system 202 may use information stored by media data 282 and/or store data in media data 282. For example, recommendation module 208 may obtain data regarding videos and corresponding multi-label classifications from one or more sources such as media data 282.

Storage devices 274 include recommendation module 208. Recommendation module 208 may be similar to recommendation module 108 as illustrated in FIG. 1 and provide similar functionality. For example, recommendation module 208 may be a software component of analysis system 202 that generates video recommendations. Recommendation module 208 may process requests for video received by analysis system 202. In an example, analysis system 202 receives a request for videos and provides information regarding the request that includes a current educational level of an individual to recommendation module 208. Recommendation module 208 processes the information regarding the request to determine one or more videos to recommend for the individual. Recommendation module 208 may recommend and/or filter videos based on a current educational status of an individual (e.g., current grade, topics requested by the individual, tutoring requests for particular topics, etc.), multi-label classifications of videos, information regarding requests for videos, information regarding the user, content restrictions, requests from the user (e.g., a request for more or less challenging videos, historical use information, and other information. Recommendation module 208 may use the multi-modal analysis framework to automatically detect fine-grained content categories and difficulty level.

In some examples, recommendation module 208 may preemptively generate recommendations for a user. Recommendation module 208 may generate recommendations for videos based on information regarding a user maintained by analysis system 202. For example, recommendation module 208 may generate a recommendation based on the educational status of a user. Recommendation module 208 may store recommendations such as the preemptively generated recommendations in media data 282.

Recommendation module 208 may provide video recommendations to one or more recipients. Recommendation module 208 may provide video recommendations in response to a request for video recommendations and/or preemptively provide recommendations prior to a request. Recommendation module 208 may provide video recommendations to one or more recipients such as user system 130 and/or media platforms such as media source 140. For example, recommendation module 208 may provide video recommendations to media source 140 for media source 140 to filter which videos it provides to a user system.

Storage devices 274 include blocking module 210. Blocking module 210 may be a software component of analysis system 202 that prevents and/or blocks an individual and/or user from viewing videos. For example, blocking module 210 may prevent a user of user system 130 from viewing videos with inappropriate content and/or insufficient educational content. Blocking module 210 may determine whether a video should be blocked based on a multi-label classification of the video. For example, blocking module 210 may determine that a video has insufficient educational content and prevent a user of user system 130 from viewing the video. Blocking module 210 may block a video based on determining that a video contains content that is inappropriate for a user of system 130 and/or that the user is otherwise blocked from viewing (e.g., the video contains content that a parent/guardian of the user has indicated that the user should be prevented from viewing). Blocking module 210 may block videos based on determining that the video contains inappropriate content such as violence, sexual content, coarse language, consumption of alcohol and/or tobacco products, consumerism (e.g., the video is an unboxing of a children's toy), and other content. Blocking module 210 may provide an indication to user system 130 and/or media source 140 to prevent viewing of the video.

Figure 3:
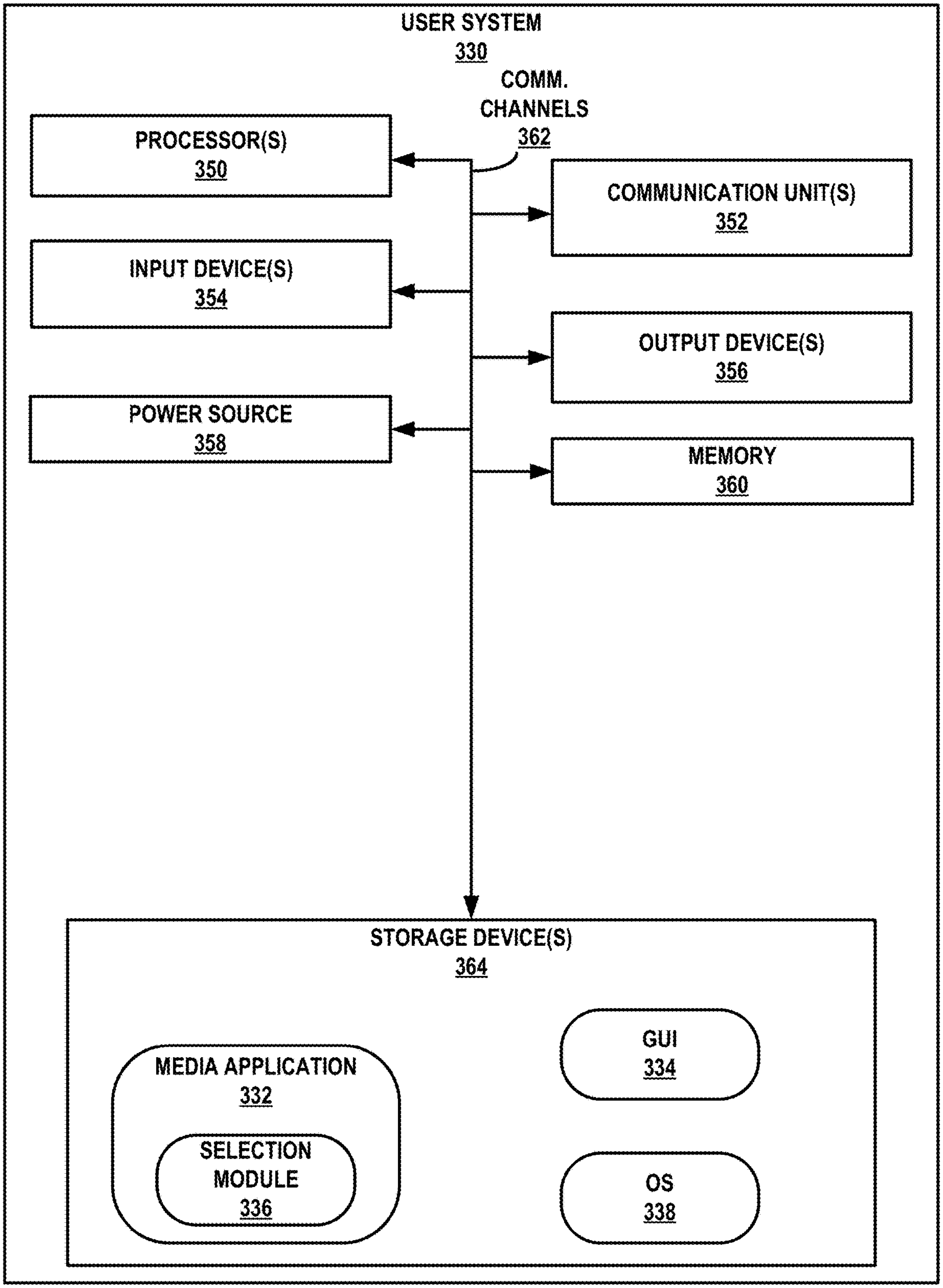
FIG. 3 is a block diagram illustrating an example user system, in accordance with one or more techniques of this disclosure.

FIG. 3 is a block diagram illustrating an example user system 330, in accordance with one or more techniques of this disclosure. User system 330 may be similar to user system 130 as illustrated in FIG. 1 and provide similar functionality. For example, user system 130 may be a computing device such as a smartphone, tablet computer, laptop computer, desktop computer, virtual machine, AR goggles/glasses, VR goggles/glasses, and another type of computing device.

User system 330 includes one or more of processors 350. Processors 350 may include one or more types of processors. For example, processors 350 may include one or more of FPGAs, ASICs, graphics processing units (GPUs), central processing units (CPUs), reduced instruction set (RISC) processors, and/or other types of processors or processing circuitry. Processors 350 may execute the instructions of one or more programs and/or processes of user system 330. For example, processors 350 may execute instructions of a process stored in memory 360.

User system 330 includes memory 360. Memory 360 may include one or more types of volatile data storage such as random access memories (RAM), dynamic random access memories (DRAM), static random access memories (SRAM), and other forms of volatile memories known in the art. Memory 360 may additionally or alternatively include one or more types of non-volatile data storage. Memory 360 may store data such as instructions for one or more processes of user system 330. For example, memory 360 may store instructions of an operating system for execution by processors 350. Memory 360 may store data provided by one or more components of user system 330. For example, memory 360 may store information provided by communication units 352.

User system 330 includes one or more of communication units 352. Communication units 352 may include one or more types of communication units/components such radios, modems, transceivers, ports, and/or other types of communication components. Communication units 352 may communicate using one or more communication protocols such as WIFI, BLUETOOTH, cellular communication protocols, satellite communication protocols, Asynchronous Transfer mode (ATM), ETHERNET, TCP/IP, optical network protocols such as Synchronous Optical Networking (SONET) and Synchronous Digital Hierarchy (SDH), and other types of communication protocols. Communication units 352 may enable user system 330 to communicate with one or more computing systems and devices. For example, communication units may enable user system 330 to communicate with analysis system 102 and/or media source 140 view network 150 as illustrated in FIG. 1.

User system 330 includes one or more of input devices 354. Input devices 354 may include one or more devices and/or components capable of receiving input such as touchscreens, microphones, keyboards, mice, and other types of input devices. Input devices 354 may enable a user of user system 330 to provide input to user system 330. For example, input devices 354 may enable a user of user system 330 to type input via a keyboard.

User system 330 includes one or more of output devices 356. Output devices 356 may include one or more devices and/or components capable of generating output such as displays, speakers, haptic engines, light indicators, and other types of output devices. Output devices 356 may enable user system 330 to provide output to a user of user system 330. For example, user system 330 may provide a graphical visualization of one or more videos that may be played.

User system 330 includes power source 358. Power source 358 may include one or more sources of power for user system 330 such as solar power, battery backup, generator backup, and power from an electrical grid. For example, user system 330 may be powered by power source 358 that includes a battery internal to user system 330.

User system 330 includes one or more of communication channels 362 (illustrated as "COMM. CHANNELS 362" in FIG. 3). Communication channels 362 may include one or more communication channels that interconnect one or more components user system 330. Communication channels 362 may include one or more types of communication channels such as hardware interconnects and/or software interconnects. For example, communication channels 362 may include a hardware interconnect between memory 360 and storage devices 364.

User system 330 includes one or more of storage devices 364. Storage devices 364 may include one or more devices and/or components capable of storing data. Storage devices 364 may include one or more types of non-volatile storage devices such as magnetic hard drives, magnetic tape drives, cloud storage, remote storage, solid state drives, NVM Express (NVMe) drives, optical media, and other types of non-volatile storage. In some examples, storage devices 364 may include one or more types of volatile storage devices.

Storage devices 364 includes OS 338. OS 338 may be an operating system (OS) of user system 330 such as a mobile OS, desktop OS, virtual machine, or other type of OS. OS 338 may provide an execution environment for one or more programs and/or processes of user system 330. For example, OS 338 may provide an execution environment for one or more software components of user system 330 such as media application 332.

Storage devices 364 include media application 332. Media application 332 may be an application such as a mobile application, desktop application, browser-based application, or other type of application. In some examples, media application 332 may be a companion application of a media platform or source such as media source 140. Media application 332 may enable a user of user system 330 to obtain and view videos. For example, media application 332 may enable user system 330 to obtain and play a video from media source 140.

Media application 332 may manage which videos are displayed to a user of user system 330. Media application 332 may manage which videos should be obtained from a media platform or source such as media source 140. For example, media application 332 may refrain from obtaining videos that include objectionable content and/or that contain insufficient educational content. Media application 332 may obtain videos from media source 332 that are determined by media source 140 (e.g., analysis system 102 provides an indication to media source 140 of what videos are allowed to be provided to user system 330). Media application 332 may include one or more components that manage which videos should be obtained.

Media application 332 includes selection module 336. Selection module 336 may be a software component such as a plugin, module, subcomponent, subprocess, and/or another type of software component. Selection module 336 may manage which videos media application 332 obtains from media source 140. For example, selection module 336 may cause media application 332 to obtain a particular set of videos from media source 140. Selection module 336 may cause media application 332 to obtain videos based on indications received from analysis system 102. In an example, media application 332 receives an indication of a set of videos from analysis system 102. Selection module 336 determines which videos should be obtained from media source 140 based on the indication from analysis system 102. In some examples, selection module 336 may cause media application 332 to retrieve a particular set of videos indicated by analysis system 102 (e.g., analysis system 102 indicates a particular set of videos that are to be shown instead of a selection of videos from which selection module 336 may select from).

Media application 332 may enable a user of user system 330 (e.g., a parent/guardian) to set criteria for videos displayed to another user (e.g., a child of the parent/guardian). Media application 332 may enable a user to enter information of the another user such as age, education level (e.g., grade level), topics for focusing/further tutoring (e.g., mathematics, literature, history, etc.), content restrictions (e.g., objectionable content, types of videos, etc.) and other information. Media application 332 may enable a user to enter the information for analysis system 102 to tailor the selection of videos to the another user.

Storage devices 364 include GUI 334. GUI 334 may be a GUI of user system 330 that includes visual elements of one or more software components of user system 330. For example, GUI 332 may include visual elements generated by OS 338 and media application 332. Media application 332 may display one or more videos via GUI 332.

Figure 4:
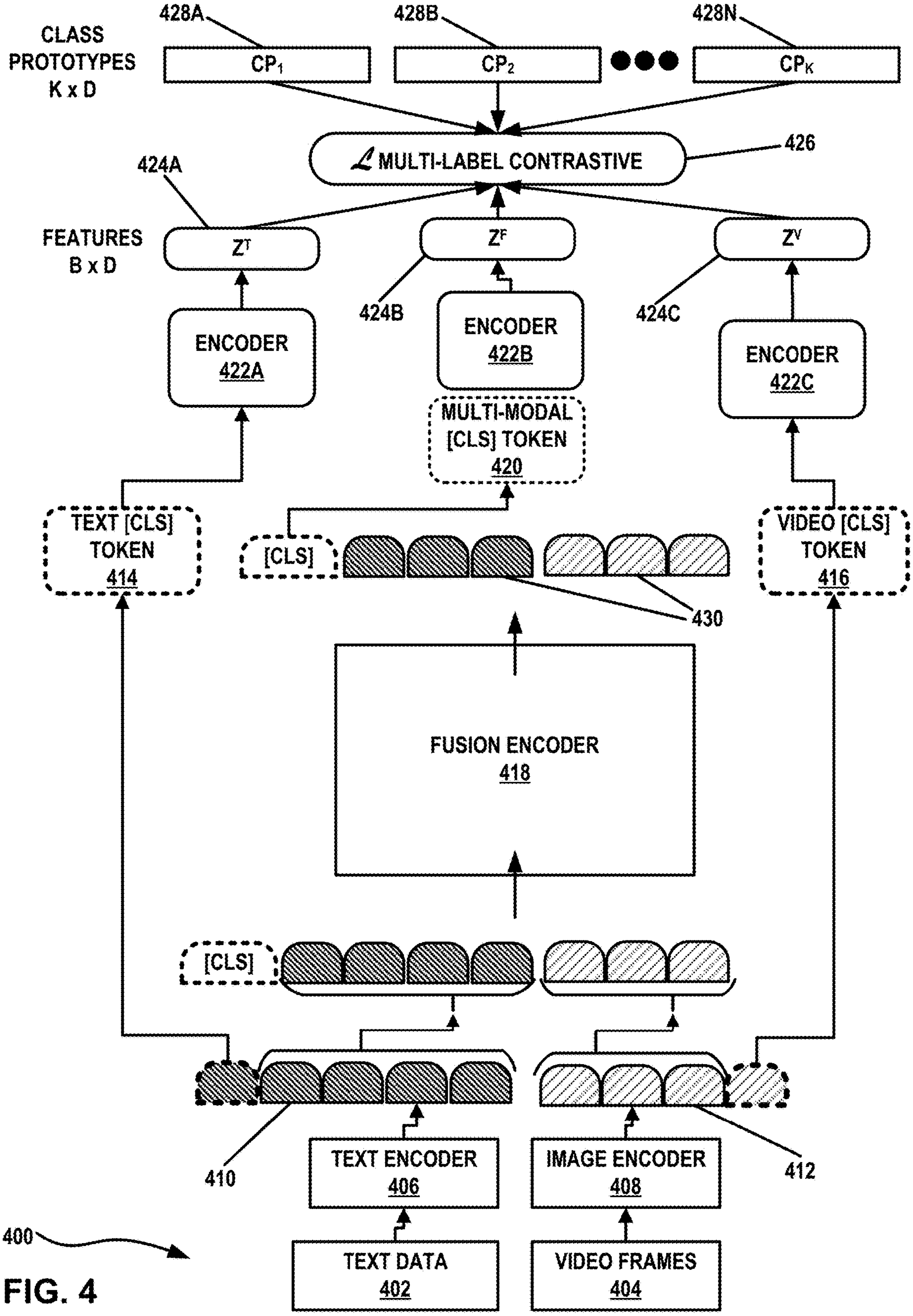
FIG. 4 is a diagram illustrating an example operation of a machine learning model, in accordance with one or more techniques of this disclosure.

FIG. 4 is a diagram illustrating an example operation of a machine learning model 400, in accordance with one or more techniques of this disclosure. For the purposes of clarity, FIG. 4 is discussed in the context of FIG. 1. For example, machine learning (ML) model 400 may represent or be included in ML model 106 of analysis system 102 illustrated in FIG. 1.

ML model 400 may receive data from analysis system 102. ML model 400 may receive data such as text data 402 and/or video frames 404 from analysis system 202. ML model 400 may receive data that has been processed by analysis system 202. For example, analysis system 102 may capture audio cues by extracting speech from an audio track of a video. Analysis system 102 may extract speech by removing background audio (e.g., instruments, noise, etc.). Analysis system 102 may process the extracted speech using one or more techniques such as ASR to transcribe the text from the speech and generate text data 402. Analysis system 102 may generate video frames 404 and provide video frames 440 to ML model 400. Analysis system 102 may generate video frames 404 may extract frames from a video processed by analysis system 102.

ML model 400 may process text data 402. ML model 400 may process text data 402 using text encoder 406. Text encoder 406 may be a software component such as a ML model, plugin, module, process, or other type of software component. For example, text encoder 406 may be a BERT-based text transformer that processes text data 402 into word embeddings and/or tokens for a text transcription. Text encoder 406 may generate text CLS token 414 (illustrated as "TEXT [CLS] TOKEN 414" in FIG. 4) for the video that is based on the speech from the video and text tokens 410. While illustrated as a single CLS token, text CLS token 414 may include a plurality of CLS tokens. For example, text encoder 406 may process text data 402 to generate CLS token 414 as a representation of the text from a video (e.g., text data 402). Text encoder 406 may use one or more ASR models such as Whisper and, for data augmentation, may generate four versions of the ASR text by back-translation using the Helsinki-NLP/opus-mt-{en-de, en-nl, en-fr} models through the nlpaug library. Synonym replacement, text span removal and random word swapping augmentations are also used for the text data. In addition, text encoder 406 may use DistilBERT-Base-uncased, and/or t5-small from HuggingFace transformers library.

Analysis system 102 may test the performance of text encoder 406. Analysis system 102 may test DistilBERT and T5 backbones for the text encoder. Text encoder 406 may use BERT as trained to predict masked spans of text. Text encoder 406 may use T5's unsupervised objective as similar, however, text encoder 406 may train T5 on predicting the entire sequence instead of the masked spans. Text encoder 406 may use GPT2 as taking an autoregressive approach to language modeling ML model 400 may process video frames using image encoder 408. Image encoder 408 may be a ML model, process, plugin, module, or other type of software component. For example, image encoder 408 may include a vision transformer that learns frame embeddings (e.g., frame tokens 412) from video frame in addition to a CLS token for each frame. Image encoder 408 may generate a plurality of frame token 412 in addition to one or more CLS tokens. Image encoder may pool the generated CLS tokens into a compact video representation (e.g., video CLS token 416). In some examples, image encoder 408 may use Random Resized Crop and RandAugment augmentations from torchvision. In addition, image encoder 408 may use ImageNet pretrained vision encoders ResNet50, ViT-B/32 (224×224 resolution) and ViT-B/16 (384×384 resolution). Image encoder 408 may include ResNet and/or ViT variants. For example, image encoder 408 may include a ViT-B/16-384 encoder for a larger COIN dataset. In addition, image encoder 408 may include a ViT-B/32-224 encoder for APPROVE.

ML model 400 may process text tokens 410 and frame tokens 412. ML model 400 may process text tokens 410 and frame tokens 412 using fusion encoder 418 to generate multi-modal tokens 430. Fusion encoder 418 may a software component of ML model 400 that includes one or more ML models, networks, processes, plugins, modules, and/or other types of software components. For example, fusion encoder 418 may include one or more feed forward networks and transformer models. Fusion encoder 418 may fuse the visual and text cues (e.g., text tokens 410 and frame tokens 412) by leveraging crossmodal attention between frame and word embeddings. Fusion encoder 418 may generate multi-modal tokens 430 and/or multi-modal CLS token 420 (illustrated as "MULTI-MODAL [CLS] TOKEN 420" in FIG. 4). Uni-modal pre-training may be carried out on the text & image encoders, respectively. Fusion encoder 418 may generate multi-modal CLS token 420 as a representation of the multi-modality of a video analyzed by analysis system 102. ML model 400 may generate multi-modal tokens 430 and multi-modal CLS token 420 as considering multi-modal cues that may be crucial for content recognition. For instance, ML model 400 may generate the tokens for education videos as effective comprehension may require attending to both visual demonstration and audio explaining the educational content. Fusion encoder 418 may provide multi-modal CLS token 420 to one or more encoders for processing.

ML model 400 includes encoders 422A-422C (hereinafter "encoders 422"). Encoders 422 may be one or more types of machine learning models and/or layers such as a multi-layer perceptrons. Encoders 422 may process text CLS token 414, video CLS token 416, and/or multi-modal CLS token 420. Encoder 422 may process text CLS token 414, video CLS token 416, and/or multi-modal CLS token 420 into one or more representations (alternatively referred to as "features" throughout) of text, video, and multi-modal cues of a video. For example, ML model 400 may generate a text feature using a first neural network, a frame feature using a second neural network, and the multi-modal feature using a third neural network and based on the multi-modal classification token. Encoder 422A may process text CLS token 414 into representation $Z_t$ of text cues of a video. Encoder 422C may process video CLS token 416 into representation $Z_v$ of video cues of a video. Encoder 422B may process multi-modal CLS token into representation $Z_f$ of multi-modal cues of a video. ML model may combine, aggregate, and/or otherwise create a representation of a video that is comprised of the three representations such as the video representation Z is comprised of $\{Z_v, Z_v, Z_f\}$. Multi-label contrastive loss may be used along with shared prototypes to align the representations across both modalities ML model 400 may generate multi-label classifications of a video based on one or more class prototypes such as class prototypes 428A-428N (hereinafter "class prototypes 428"). ML model 400 may learn class prototypes 428 as representations of class labels. For example, analysis system 102 may train one or more machine learning models based on a plurality of class labels to generate and/or learn class prototypes 428. Class prototypes 428 may be based on information such as educational content standards, objectionable content identifiers (e.g., identifiers of particular types of objectionable content), and/or other information. For example, ML model 400 may generate class prototype 428A as based on an educational standards code for fourth grade-level mathematics.

ML model 400 may generate multi-label classifications using multi-label contrastive framework 426. Multi-label contrastive framework 426 may include using one or more techniques and/or ML models. Multi-label contrastive framework 426 may be executed and/or facilitated by a component such as contrastive module 278 as illustrated in FIG. 2. For example, multi-label contrastive framework 426 executed by contrastive module 278 may determine a distance between each of class prototypes 428 and features 424. Multi-label 426 may use the distance to perform inference on features 424 and generate multi-label classifications. Multi-label contrastive framework 426 may use one or more types of distance metrics, such as cosine distance, Euclidean distance, and/or other types of distance metrics to perform inference. ML model 400 may output the generated multi-label classifications to one or more components of analysis system 102.

Analysis system 102 may train ML model 400 during one or more training processes. Analysis system 102 may train ML model 400 using a joint end-to-end learning of one or more components of ML model 400 (e.g., fusion encoder 418). In addition, analysis system 102 may further refine class prototypes 428 during a multi-modal training phase. Analysis system 102 may follow a two-stage training process: during the initial unimodal training phase, analysis system 102 may utilize fixed prototypes in each modality to align the representations. Then in the second stage, analysis system 102 may train the unimodal encoders and the multi-modal fusion encoder (e.g., fusion encoder 418) end-to-end. ML model 400 may use cross-modal alignment learned during the first stage to improve the learning of the multi-modal representation. ML model 400 may use a multi-modal learning phase that includes alternating optimization steps of training the network using contrastive loss and refining class prototypes 428.

Analysis system 102 may optimize ML model 400. Analysis system 102 may employ an optimized such as AdamW for training with a learning rate of 0.0005. Analysis system 102 may use a weight decay of 1e-6 on the MLP head during contrastive training and the classifier during BCE/Focal/Asym. loss. Analysis system 102 may use pre-trained vision and text backbones and set the backbone learning rate to 1/10th of the learning rate for the head. Analysis system 102 may use Exponential Moving Averaging every 10 steps with a decay of 0.999 for the model parameters.

ML model 400 may process one or more videos to determine whether the videos contain educational content and to characterize the content. ML model 400 may overcome challenges as the education codes by such as Common Core Standards can be similar such as ‘letter names’ and ‘letter sounds’, where the former focuses on the name of the letter and the latter is based on the phonetic sound of the letter. In addition, ML model 400 may understand education content that requires analyzing both visual and audio cues simultaneously as both signals are to be present to ensure effective learning. Conversely, standard video classification benchmarks such as other video services may use visual cues to detect the different classes. Finally, unlike standard well-known action videos, ML model 400 may use education codes that are more structured and not accessible to common users. ML model 400 may use a carefully curated set of videos and expert annotations to create a dataset to enable a data-driven approach. For example, ML model 400 may focus on two widely used educational content classes: literacy and math. For each class, ML model 400 may choose prominent codes (sub-classes) based on the Common Core State Standards that outline age appropriate learning standards. For example, ML model 400 may use literacy codes that include ‘letter names’, ‘letter sounds’, ‘rhyming’, and math codes include ‘counting’, ‘addition and subtraction’, ‘sorting’, ‘analyzing shapes’.

ML model 400 may formulate the problem as a multilabel fine-grained video classification task as a video may contain multiple types of content that can be similar. ML model 400 may employ multi-modal cues since besides visual cues, audio cues may provide important cues to distinguish between similar types of educational content. ML model 400 may use class prototypes based supervised contrastive learning approach. ML model 400 may learn a prototype embedding for each class. ML model 400 may employ a loss function to minimize the distance between a class prototype and the samples associated with the class label. Similarly, ML model 400 may maximize the distance between a class prototype and the samples without that class label. ML model 400 may extended classification for the proposed multilabel setup as samples may not be identified as positive or negative due to the multiple labels. ML model 400 may jointly learn the embedding of the class prototypes and the samples. ML model 400 may use embeddings that are learned by a multi-modal transformer network (MTN) that captures the interaction between visual and audio cues in videos. ML model 400 may employ automatic speech recognition (ASR) to transcribe text from the audio. ML model 400 use an MTN that consists of video and text encoders that learn modality-specific embedding and a cross-attention mechanism is employed to capture the interaction between them. ML model 400 may use MTN that is end-to-end learned through the contrastive loss.

Figure 5:
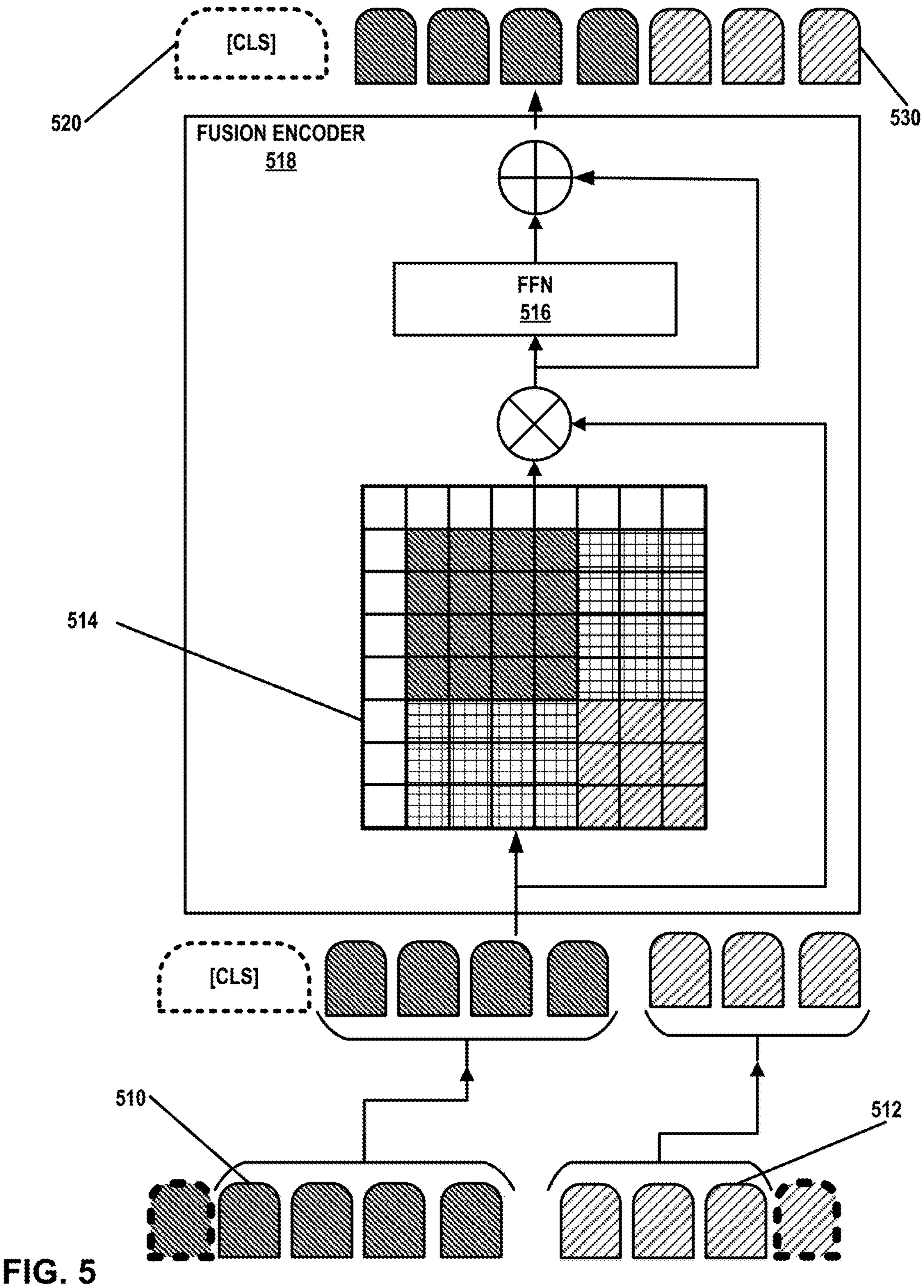
FIG. 5 is a diagram illustrating an example operation of a fusion encoder, in accordance with one or more techniques of this disclosure.

FIG. 5 is a diagram illustrating an example operation of a fusion encoder 518, in accordance with one or more techniques of this disclosure. Fusion encoder 518 may be similar to fusion encoder 276 as illustrated in FIG. 2 and/or fusion encoder 418 as illustrated in FIG. 4. For example, fusion encoder 518 may generate multi-modal tokens 530.

Fusion encoder 518 may receive a plurality of tokens. Fusion encoder 518 may receive a one or more of text tokens 510 and one or more of frame tokens 512. Fusion encoder 518 may receive text tokens 510 that are representative of audio of a video. Fusion encoder 518 may receive frame tokens 512 that are representative of frames of a video. Fusion encoder 518 may receive text tokens 510 and frame tokens 512 from one or more other components of an analysis system such as analysis system 202 as illustrated in FIG. 2.

Fusion encoder 518 may process the received tokens using attention module 514. Attention module 514 may a software component of fusion encoder that includes one or more ML models, modules, plugins, processes, and/or other types of software component. For example, attention module 514 may include a multi-head cross attention module that processes the received tokens and applies multi-head cross attention. In some examples, attention module 514 may include a module that applies multi-head self-attention. Attention module 514 may include one or more attention layers. Attention module 514 may process the obtained tokens and provide an output to a feed forward network and/or other operation of fusion encoder 518. For example, attention module 514 may apply the one or more attention layer to text token 510 and frame tokens 514.

Fusion encoder 518 may include a component that generates a Kronecker product of the output of attention module

514 and the tokens received by fusion encoder 518. Fusion encoder 518 may include one or more software and/or hardware components that generate the Kronecker product of the output of attention module 514 and the received tokens. For example, fusion encoder may include a software product that generates the Kronecker product and provides the output to FFN 516.

Fusion encoder 518 includes feed forward network 516 (illustrated as and hereinafter referred to as "FFN 516" in FIG. 5). FFN 516 may be one or more types of feed forward networks. FFN 516 may process tokens received by fusion encoder 516 and tokens processed by attention module 514. FFN 516 may output the processed tokens to one or more recipient components. For example, FFN 516 may output to an XOR component or operation of fusion encoder 518.

Fusion encoder 518 may include a component that generates an XOR product of the output of FFN 516 and the Kronecker product. Fusion encoder 518 include one or more hardware and/or software components that generate an XOR product. For example, fusion encoder 518 may include an FPGA or software component that generates the XOR product. Fusion encoder 518 may generate an XOR product that includes one or more multi-modal tokens 530 and multi-modal CLS token 520. Fusion encoder 518 may output the XOR product to one or more recipient components such as one or more encoders. For example, fusion encoder 518 may output the XOR product to one or more recipient components for generation of the multi-label classification.

Figure 6:
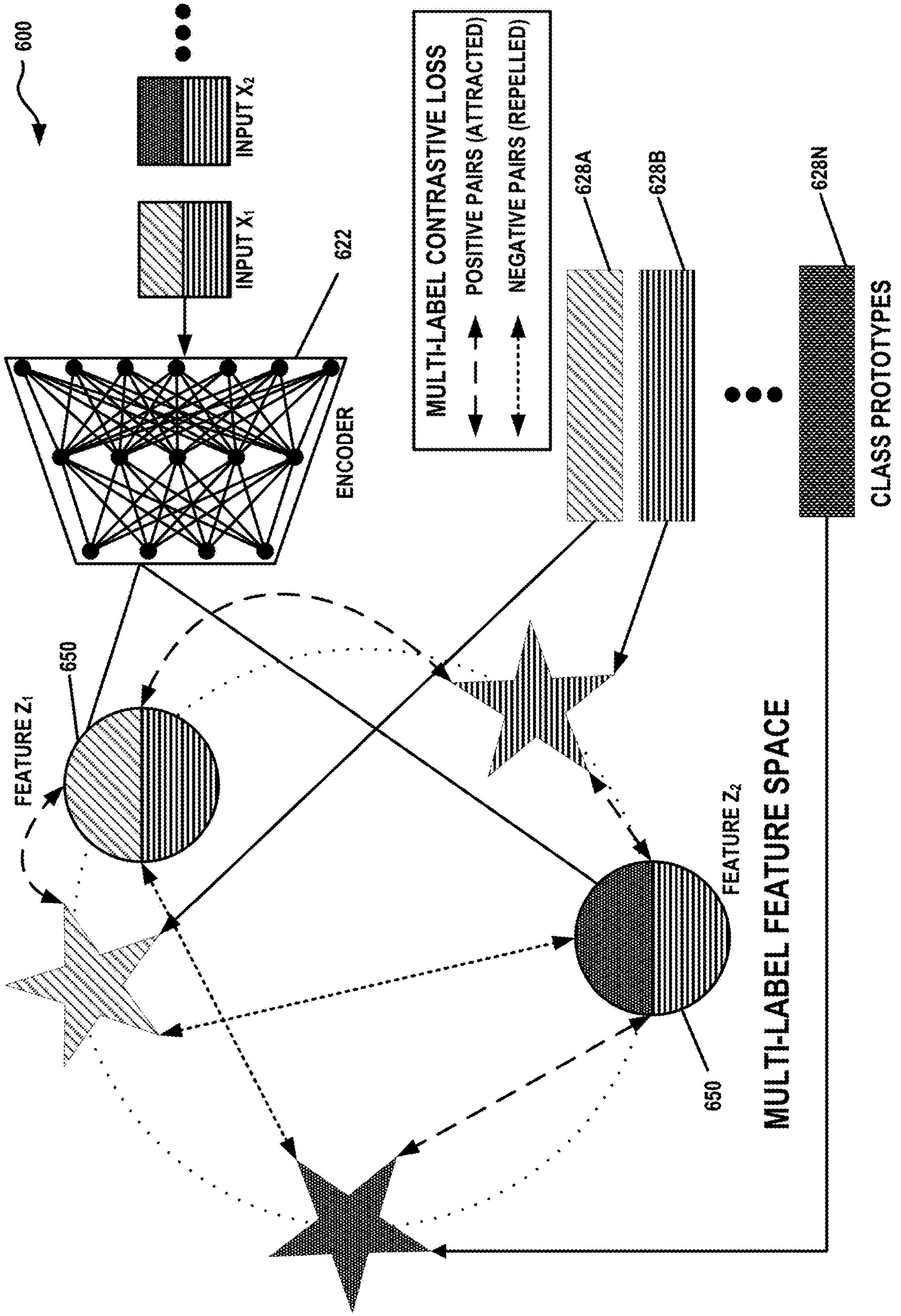
FIG. 6 is a diagram illustrating an example operation of a multi-label contrastive framework, in accordance with one or more techniques of this disclosure.

FIG. 6 is a diagram illustrating an example operation of multi-label contrastive framework 600, in accordance with one or more techniques of this disclosure. For the purposes of clarity, FIG. 6 is discussed in the context of FIG. 4. For example, multi-label contrastive framework 600 (hereinafter "MCF 600") may be similar to multi-label contrastive framework 426 as illustrated in FIG. 4 and provide similar functionality.

MCF 600 may include a plurality of class prototypes 628A-628N (hereinafter "class prototypes 628"). Class prototypes 628 may be learned and/or generated by one or more components of a machine learning model such as ML model 400. MCF 600 may learn class prototypes as the representative for each class and consider these as anchors while determining positive and negative samples. Specifically, for a specific class prototype, a representation is learned to minimize distances between the prototype and samples with this class label and maximize the distances between the prototype and samples without this class label. MCF 600 may use multi-label contrastive learning instead of c single-label contrastive learning. MCF 600 may iteratively update the class prototypes while learning the feature representations. MCF 600 may define $C=\{c_1, \ldots, c_K\}$ as the set of classes where K is the number of classes. For a sample x, MCF 600 may define Pml(x)={c+k}, c+k∈C as the set of multiple class labels associated with x (positive classes) and c−k∈C\Pml(x) denotes the missing classes (negative classes). MCF 600 may define $CP=\{cp_1, \ldots, cp_K\}$ as the set of class prototypes. MCF 600 may use z as the representation for the sample x. MCF 600 may define multi-label contrastive loss as $$\mathcal{L}_{mlc}(x) = \frac{-1}{|P_{ml}(x)|} \sum_{c_k^+ \in P_{ml}(x)} \left[ \log \frac{\exp\left(\frac{sim(z, cp_k)}{\tau}\right)}{\sum_{c_j^- \in C \setminus P_{ml}(x)} \exp\left(\frac{sim(z, cp_j)}{\tau}\right)} \right]$$

MCF 600 may use one or more techniques for initializing class prototypes 628. MCF 600 may compare the two strategies where after initializing the class prototypes, 1) keeping class prototypes 628 fixed and learn only the multi-modal embedding of the samples, and 2) class prototypes 628 and sample embedding are learned iteratively. MCF 600 may initialize class prototypes 628 either randomly, and/or with orthogonal constraints. MCF 600 may use orthogonal initialization when orthogonal initializing performs best in experiments and iterative adjusting the class prototypes achieves better performance. MCF 600 may consider hierarchical prototypes, for APPROVE, using a 2-level hierarchy where the first level consists of 18 classes, and the second level is the 3 super-classes: math, literacy, and background. MCF 600 may use 180 task categories of COIN that are organized into 12 domains in the taxonomy provided with the dataset. MCF 600 may use a hierarchy that imposes an additional constraint on learning the embeddings during training.

MCF 600 may minimize the loss of the positive class prototype and instance pairs in the numerator minimizes the distance between the representation z and the class prototypes corresponding to the sample, and vice versa for negative classes. MCF 600 may also utilize negative sampling to account for the class imbalance between positives and negatives MCF 600 may learn class-specific prototypes such that the multilabel samples can be thought of as the combinations of the class prototypes selected based on the associated labels. For example, MCF may generate Zt as an N×d matrix of d-dimensional representations, i.e., zs), of N samples and L∈{0, 1}N×K is corresponding labels matrix with K classes. MCF 600 may denote CPt is a matrix of size K×d of K class prototypes at a training iteration t. Then, $Z_t=L\times CP_t+\varepsilon$, where ε is the residual noise term. MCF 600 may assume a Gaussian noise that is unbiased and uncorrelated with the labels L and approximate class prototypes as $CP_t^*$≈(LT L)−1LT $Z_t$, where operation (LT L) results in a square matrix amenable to inversion. For single labels, MCF 600 may imply averaging the features of the instances belonging to a given class as the prototype for that class. In a multi-label setup, MCF 600 may consider the co-occurrence between the labels. MCF may update class prototypes 628 with learning iterations such as $$CP_{t+1} = \beta * CP_t + (1 - \beta) * CP_t^*$$

where β may be the decay parameter for the exponential moving average. MCF 600 may use the moving average to avoid collapsing prototypes across training iterations.

MCF 600 may use inference based on class prototypes. MCF 600 may rely on class prototypes 628 to carry out inference by utilizing the distance between the learned prototypes and test features. MCF 600 may use one or more types of distance metrics, such as cosine distance, Euclidean distance, and/or other types of distance metrics. Given the prototype loss-based training, MCF 600 may determine an estimated probability of a given class proportional to the normalized temperature scaled distance, such as cosine distance. MCF 600 may normalize the cosine distance such that −1 and 1 correspond to a confidence of 0 & 1 respectively. MCF 600 may generate a prediction such as:

$$\hat{p}(k \mid x) \propto \exp\left(\frac{sim(z, cp_k)}{\tau}\right)$$

where z is a multi-modal representation of the sample x.

MCF 600 may process inputs using one or more encoders such as encoder 622. Encoder 622 may include one or more machine learning models. Encoder 622 may include a single encoder model that processes one or more types of tokens. In some examples, encoder 622 includes an encoder model for processing a corresponding type of token. Encoder 622 may process the tokens and generate multi-label classifications. In the example of FIG. 6, MCF 600 may process each sample and the class prototypes corresponding to the labels associated with the sample and treat them as positive pairs. Similarly, MCF 600 may determine negative pairs based on the missing class labels. MCF 600 may generate prototypes represented by stars (★) and inputs as circles (○) colored with all their relevant labels.

MCF 600 may use one or more datasets. MCF 600 may use one or more datasets to train and/or evaluate the performance of the multi-label classifications. For example, MCF 600 may evaluate the approach on datasets such as a subset of Youtube-8M and COIN datasets. YT-8M may include of a diverse set of videos with video and audio modalities. MCF 600 may consider a subset of YT-8M dataset with 46K videos and 165 classes. MCF 600 may use a database such as COIN that consists of instructional videos covering a wide variety of domains and spanning over 180 classes.

MCF 600 may compare efficacy of multi-label classifications against one or more baselines. MCF 600 may compare against one or more baselines such as:

1) Binary cross-entropy. MCF 600 may compute loss for multiple labels by combining the binary cross-entropy losses for individual classes.
2) Focal loss. MCF 600 may consider a modified binary cross-entropy to assign a higher weight to hard samples by adjusting a focusing parameter $\gamma$. MCF 600 may down-weight negative samples by using a weight $\alpha$. MCF 600 may give a positive label such as:

$$\mathcal{L}_{focal}(p) = -\alpha(1-p)^{\gamma}\log(p)$$

where $\gamma$=23 and $\alpha$=0.2.

3) Asymmetric loss. MCF 600 may build upon focal loss by utilizing different focusing parameters such as $\gamma_+$ and $\gamma_-$ for positive and negative samples, respectively. MCF 600 may ignore native samples with a prediction probability lower than a margin m. For example, MCF 600 may give asymmetric loss for prediction p corresponding to a label y as:

$$\mathcal{L}_{asym}(p, y) = -yL_+ - (1-y)L_-$$

where $$L_+ = (1-p)^{\gamma+} * \log(p)$$

and where $$L_- = (\max(p-m, 0))^{\gamma-} * \log(1 - \max(p-m, 0))$$

MCF 600 may follow a five step procedure to train a baseline. For example, MCF 600 may experimentally set {$\gamma_-$=2, $\gamma_+$=1, m=0.1} corresponding to the best performance on a dataset such as APPROVE.

4) Metrics. MCF 600 may achieve relatively high precision as part of developing a reliable education content detection framework. MCF 600 may use a metric such as Recall@80% Precision (hereinafter "R@80") as a primary metric. MCF 600 may also consider the standard area under the precision-recall curve (AUPR) that is not sensitive to a specific threshold for making the final prediction. In addition, MCF 600 may consider a label ranking average precision (LRAP) metric that may be more suitable for the multilabel setup. MCF 600 may use LRAP to estimate whether the ground truth classes are predicted with higher scores than the rest:

$$LRAP = \frac{1}{n}\sum_{i=1}^{m}\frac{1}{|Y_i|}\sum_{\lambda \in Y_i}\frac{\left|\lambda' \in Y_i : rnk_i(\lambda') \le rnk_i(\lambda)\right|}{rnk_i(\lambda)}$$

where $rnk_i(\lambda)$ is the predicted rank of class $\lambda$ for sample i. MCF 600 may use LRAP as a ranking metric and in independence of a threshold.

MCF 600 may compare proposed approaches with one or more baselines. For example, MCF 600 may determine that a particular approach outperforms the strongest baselines by 3.1% and 2.3% with respect to R@80 and AUPR, respectively. MCf 600 may determine results for separate models trained on Math and Literacy subsets of APPROVE, respectively. In an example MCF 600 may determine that results on a Math subset are higher compared to a Literacy subset, which may indicate that the literacy classes are harder to distinguish mostly due to the high inter-class similarity. MCF 600 may determine that the top three hardest classes are follow words, letters in words, and sounds in words and these are from the literacy set.

MCF 600 may test the proposed approaches one or more datasets such as public datasets. For example, MCF 600 may test one or more approaches on public datasets such as YT-46K and COIN. As YT-8M was primarily collected with the intention of visual classification, MCF 600 may determine that additional use of text data leads to a smaller improvement compared to APPROVE. MCF 600 may map each video from COIN to a single task. MCF 600 consider the Top-1 accuracy as the metric. On COIN MCF 600 may compare an approach with SupCon which may be effective for single labels. MCF 600 may determine that an approach outperforms SupCon and may justifies the effectiveness of the class prototypes based training in a generic contrastive learning framework.

MCF 600 may determine the robustness of an approach. For example, MCF 600 may compare one or more approaches using one or more metrics to evaluate the robustness. MCF 600 may use metrics such as:

1) Noisy modality. MCF 600 may process videos that have noisy modalities where some of the video frames are missing, or ASR transcription is noisy. MCF 600 may determine whether an approach is robust against the cases where a percentage of video frames or text words are missing (e.g., due to noise in a video.

2) Run-to-Run variance. MCF 600 may determine the variance across runs. For example, MCF 600 may determine that a low variance across runs indicates that an approach is not sensitive to random initialization of class prototypes 628.

3) Initialization the encoders. MCF 600 may one or more types of pretraining such as ImageNet pretraining for the image encoder. In addition, MCF 600 may use English Wikipedia+Toronto Book Corpus is used to pre-train the text encoder (e.g., an encoder such as encoder 622). MCF 600 may generate results where the backbones are initialized with CLIP, which may provide a more aligned vision-text representation. MCF 600 may determine that the results are better with the CLIP initialization. In addition, MCF 600 may determine that improvements are more significant on COIN than APPROVE as CLIP models may not be exposed to educational videos.

Figure 7:
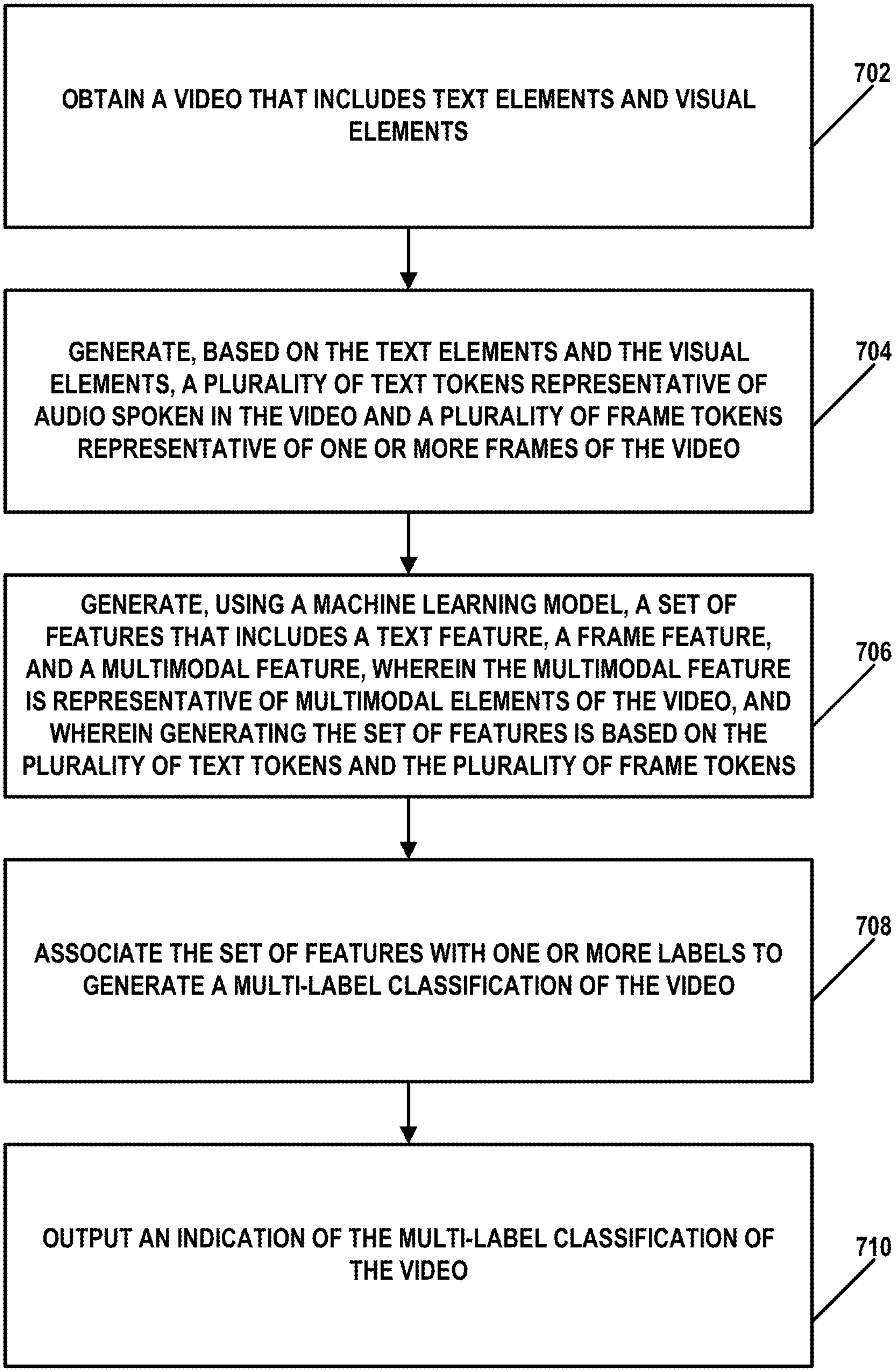
FIG. 7 is a flow chart illustrating an example operation of an analysis system, in accordance with one or more techniques of this disclosure.

FIG. 7 is a flow chart illustrating an example operation of an analysis system, in accordance with one or more techniques of this disclosure. For the purposes of clarity, FIG. 7 is described in the context of FIG. 1.

An analysis system, such as analysis system 102, obtains a video that includes text elements and visual elements (702). Analysis system 102 may obtain the video from one or more sources, such as media source 140. Analysis system 102 may obtain the video in response to a request from a user system, such as user system 130, and/or preemptively obtain the video. For example, analysis system 102 may preemptively obtain a plurality of videos from media source 140.

Analysis system 102 generates, based on the text elements and the visual elements, a plurality of text tokens representative of audio spoken in the video and a plurality of frame tokens representative of one or more frames of the video (704). Analysis system 102 may generate the text tokens and the frame tokens using one or more techniques. For example, analysis system 102 may generate the text tokens using a text transformer and the frame tokens using an image encoder. Analysis system 102 may generate a text classification token such as a text CLS token representative of text tokens. Analysis system 102 may generate a frame CLS token that is a representation of the video.

Analysis system 102 generates, using a machine learning model such as ML 106, a set of features that includes a text feature, a frame feature, and a multi-modal feature, wherein the multi-modal feature is representative of multi-modal elements of the video, and wherein generating the set of features is based on the plurality of text tokens and the plurality of frame tokens (706). Analysis system 102 may use ML 106 that includes one or more layers and/or components to generate the set of features. Analysis system 102 may process the text tokens and the frame tokens to generate the multi-modal features. For example, ML model 106 may process the text tokens and the frame tokens using a fusion encoder to generate the features.

Analysis system 102 associates the set of features with one or more labels to generate a multi-label classification of the video (708). Analysis system 102 may generate a multi-label classification of the video where the labels are based on one or more educational content codes. Analysis system 102 may use one or more techniques to associate the set of features with the one or more labels. For example, analysis system 102 may determine a distance between each feature and a corresponding label, such as a cosine distance.

Analysis system 102 output an indication of the multi-label classification of the video (710). Analysis system 102 may output an indication of the classification to one or more recipients. For example, analysis system 102 may output an indication of the classification to media source 140. Analysis system 102 may output the indication to user system 130 for a user (e.g., a parent/guardian of a child who uses user system 130) to select one or more videos for the child to view.

The above examples, details, and scenarios are provided for illustration, and are not intended to limit the disclosure in any way. Those of ordinary skill in the art, with the included descriptions, should be able to implement appropriate functionality without undue experimentation. References in the specification to "an embodiment," "configuration," "version," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Examples in accordance with the disclosure may be implemented in hardware, firmware, software, or any combination thereof. Modules, data structures, function blocks, and the like are referred to as such for ease of discussion and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relations or associations between elements may be simplified or not shown in the drawings so as not to obscure the disclosure. This disclosure is to be considered as exemplary and not restrictive in character, and all changes and modifications that come within the spirit of the disclosure are desired to be protected.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, engines, or components may be implemented together or separately as discrete but interoperable logic devices. Depiction of different features as modules, engines, or units is intended to highlight different functional aspects and does not necessarily imply that such modules, engines or units must be realized by separate hardware or software components. Rather, functionality associated with one or more modules, engines, or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, processing circuitry, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), Flash memory, a hard disk, a CD-ROM, a floppy disk, a cassette, magnetic media, optical media, or other computer readable media. A computer-readable medium may include any mechanism for storing or transmitting information in a form readable by a machine. For example, a computer-readable medium may include any suitable form of volatile or non-volatile memory. In some examples, the computer-readable medium may comprise a computer-readable storage medium, such as non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A method comprising:

obtaining, by a computing system, a video that includes text elements and visual elements;

generating, by the computing system and based on the text elements and the visual elements, a plurality of text tokens representative of audio spoken in the video and a plurality of frame tokens representative of one or more frames of the video;

generating, by the computing system using a machine learning model, a set of features that includes a text feature, a frame feature, and a multi-modal feature, wherein the multi-modal feature is representative of multi-modal elements of the video, wherein generating the multi-modal feature includes applying cross-attention to the text tokens and the frame tokens, and wherein generating the set of features is based on the plurality of text tokens and the plurality of frame tokens;

associating, by the computing system, the set of features with one or more labels to generate a multi-label classification of the video by determining, using a contrastive loss function, a corresponding distance between each feature of the set of features, including the text feature, the frame feature, and the multi-modal feature, and each class prototype of a plurality of class prototypes; and outputting, by the computing system, an indication of the multi-label classification of the video.

2. The method of claim 1, wherein generating the set of features includes:

generating, using a transformer model and the text tokens and the frame tokens, a multi-modal classification token for the video, and wherein generating the set of features is based on the multi-modal classification token.

3. The method of claim 2, wherein the transformer model includes one or more attention layers, and wherein generating the multi-modal classification token for the video comprises applying the one or more attention layers to the text tokens and the frame tokens.

4. The method of claim 2, wherein generating the set of features includes:

generating the text feature using a first neural network, the frame feature using a second neural network, and the multi-modal feature using a third neural network and based on the multi-modal classification token.

5. The method of claim 2, wherein the transformer model comprises an encoder that applies multi-head cross attention to the text tokens and the frame tokens to generate the multi-modal feature.

6. The method of claim 1, wherein each class prototype of the plurality of class prototypes is representative of a corresponding classification.

7. The method of claim 6, further comprising:

learning, by the computing system, the plurality of class prototypes based on maximized distances between each of the plurality of class prototypes and a corresponding feature of the set of features.

8. The method of claim 1, further comprising:

determining, by the computing system and based on the multi-label classification, whether a particular video meets one or more content requirements for viewing by a user; and outputting an indication of whether the particular video meets the one or more content requirements for viewing by the user.

9. The method of claim 8, wherein outputting the indication of whether the particular video meets the one or more content requirements for viewing by the user comprises filtering or permitting the particular video.

10. The method of claim 1, further comprising:

receiving, by the computing system, an indication of educational content requirements associated with a user;

generating, by the computing system and based on the multi-label classification of the video and the educational content requirements associated with the user, a recommendation for the user to view the video; and outputting an indication of the recommendation.

11. A computing system comprising:

a memory; and one or more programmable processors in communication with the memory, and configured to:

obtain a video that includes text elements and visual elements;

generate, based on the text elements and the visual elements, a plurality of text tokens representative of audio spoken in the video and a plurality of frame tokens representative of one or more frames of the video;

generate, using a machine learning model, a set of features that includes a text feature, a frame feature, and a multi-modal feature, wherein the multi-modal feature is representative of multi-modal elements of the video, wherein to generate the multi-modal feature the one or more programmable processors are configured to apply cross-attention to the text tokens and the frame tokens, and wherein generating the set of features is based on the plurality of text tokens and the plurality of frame tokens;

associate the set of features with one or more labels to generate a multi-label classification of the video based on a determination, using a contrastive loss function, of a corresponding distance between each feature of the set of features, including the text feature, the frame feature, and the multi-modal feature, and each class prototype of a plurality of class prototypes; and output an indication of the multi-label classification of the video.

12. The computing system of claim 11, wherein to generate the set of features, the one or more programmable processors are further configured to:

generate, using a transformer model and the text tokens and the frame tokens, a multi-modal classification token for the video, and wherein generation of the set of features is based on the multi-modal classification token.

13. The computing system of claim 12, wherein the transformer model includes one or more attention layers, and wherein generation of the multi-modal classification token for the video comprises application of the one or more attention layers to the text tokens and the frame tokens.

14. The computing system of claim 12, wherein to generate the set of features, the one or more programmable processors are further configured to:

generate the text feature using a first neural network, the frame feature using a second neural network, and the multi-modal feature using a third neural network and based on the multi-modal classification token.

15. The computing system of claim 12, wherein the transformer model comprises an encoder that applies multi-head cross attention to the text tokens and the frame tokens to generate the multi-modal feature.

16. The computing system of claim 11, wherein each class prototype of the plurality of class prototypes is representative of a corresponding classification.

17. The computing system of claim 16, wherein the one or more programmable processors are further configured to:

learn the plurality of class prototypes based on maximized distances between each of the plurality of class prototypes and a corresponding feature of the set of features.

18. The computing system of claim 16, wherein the one or more programmable processors are further configured to:

determine, based on the multi-label classification, whether a particular video meets one or more content requirements for viewing by a user; and output an indication whether the particular video meets one or more content requirements for viewing by the user.

19. Non-transitory computer-readable media comprising instructions executable to cause one or more processors to:

obtain a video that includes text elements and visual elements;

generate, based on the text elements and the visual elements, a plurality of text tokens representative of audio spoken in the video and a plurality of frame tokens representative of one or more frames of the video;

generate, using a machine learning model, a set of features that includes a text feature, a frame feature, and a multi-modal feature, wherein the multi-modal feature is representative of multi-modal elements of the video, wherein to generate the multi-modal feature the instructions cause the one or more processors to apply cross-attention to the text tokens and the frame tokens, and wherein generation of the set of features is based on the plurality of text tokens and the plurality of frame tokens;

associate the set of features with one or more labels to generate a multi-label classification of the video based on a determination, using a contrastive loss function, of a corresponding distance between each feature of the set of features, including the text feature, the frame feature, and the multi-modal feature, and each class prototype of a plurality of class prototypes; and output an indication of the multi-label classification of the video.

20. The method of claim 1, wherein generating the multi-modal feature includes:

applying cross-attention using the text tokens to query the frame tokens or using the frame tokens to query the text tokens.

* * * * *